(12) United States Patent
Kakaire

(10) Patent No.: US 11,531,446 B1
(45) Date of Patent: Dec. 20, 2022

(54) BUSINESS, JOBS AND RELIGIOUS APPS FRAMEWORK (BJRAF)

(71) Applicant: James Kirunda Kakaire, Silver Spring, MD (US)

(72) Inventor: James Kirunda Kakaire, Silver Spring, MD (US)

(73) Assignee: Prozindu, LLC, Silver Spring, MD (US)

(*) Notice: Subject to any disclaimer, the term of this patent is extended or adjusted under 35 U.S.C. 154(b) by 0 days.

(21) Appl. No.: 16/226,557

(22) Filed: Dec. 19, 2018

Related U.S. Application Data

(60) Provisional application No. 62/607,542, filed on Dec. 19, 2017.

(51) Int. Cl.
| | | |
|---|---|---|
| *G06Q 10/10* | (2012.01) | |
| *G06Q 10/06* | (2012.01) | |
| *G06Q 30/04* | (2012.01) | |
| *G06Q 30/06* | (2012.01) | |
| *G06Q 30/02* | (2012.01) | |
| *G06F 3/0482* | (2013.01) | |

(52) U.S. Cl.
CPC ..... *G06F 3/0482* (2013.01); *G06Q 10/06398* (2013.01); *G06Q 10/1053* (2013.01); *G06Q 30/04* (2013.01); *G06Q 30/0277* (2013.01); *G06Q 30/0633* (2013.01); *G06Q 30/0641* (2013.01)

(58) Field of Classification Search
CPC .................. G06Q 10/1053; G06Q 10/1091
See application file for complete search history.

(56) References Cited

U.S. PATENT DOCUMENTS

| | | | | |
|---|---|---|---|---|
| 5,117,353 | A * | 5/1992 | Stipanovich | G06Q 10/06 705/7.14 |
| 8,700,505 | B2 * | 4/2014 | McCrea | G06Q 30/04 705/34 |
| 2007/0094110 | A1 * | 4/2007 | McCrea | G06Q 30/04 705/32 |
| 2007/0192130 | A1 * | 8/2007 | Sandhu | G06Q 10/1053 705/321 |
| 2008/0120152 | A1 * | 5/2008 | McCrea | G06Q 10/06 705/7.12 |
| 2013/0018687 | A1 * | 1/2013 | Agrawal | G06Q 30/08 705/7.14 |

(Continued)

FOREIGN PATENT DOCUMENTS

WO    WO-2017205942 A1 * 12/2017 ......... G06Q 10/1053

*Primary Examiner* — Scott A Zare

(57) ABSTRACT

The invention provides a technology for electronic job processing which includes hiring, rating and paying short term workers. The method of architecting database schemas in conjunction with algorithms provides modules that dynamically automate processes including invoices on a mobile phone app. After authenticating a user on a mobile phone or computer, the algorithms display departmental user menus that provide functions based on user type. The rating mechanism which utilizes a numerical method to assign percentage values to a graphical rating input and stores it numerically in a database or file from where it is modified by a positive or negative value enables worker selection based on competence. The invention provides a window for displaying ads in the mobile apps in form of text, video or audio.

18 Claims, 37 Drawing Sheets

(56) References Cited

U.S. PATENT DOCUMENTS

| | | | |
|---|---|---|---|
| 2016/0321614 A1* | 11/2016 | Leslie | G06Q 10/1053 |
| 2017/0193450 A1* | 7/2017 | Potratz | G06Q 10/105 |
| 2018/0060823 A1* | 3/2018 | Garimella | G06Q 10/1053 |
| 2018/0158026 A1* | 6/2018 | Zentefis | G06Q 10/1053 |
| 2018/0232703 A1* | 8/2018 | Chuang | G06Q 10/1091 |
| 2019/0066055 A1* | 2/2019 | Ruiz | H04W 4/02 |
| 2019/0139000 A1* | 5/2019 | Sharpe | G06Q 10/1053 |

* cited by examiner

Diagrams

FIG 1

User interfaces for posting Resume and Non Resume based jobs

Job Listing

| | Job Listings | |
|---|---|---|
| 1 | Job Listings | |
| 2 | Choose Your Starting Point: Home Address ● Current Location ○ | |
| 3 | Radius: 15 Miles ▼  Search | |
| 4 | Sort By: Pay Rate ▼  Sort | |
| 5 | Job ID | 02-2256 |
| 6 | Job Title | General Construction Help |
| 7 | Job Description | Demolition, Site Cleanup |
| 8 | Location | Fairfax, VA |
| 9 | Pay Rate | $17.50 |
| 10 | No. of Hours | 8 |
| 11 | Date Time | September 3 2017; 8:00AM |
| 12 | Distance | 14 Miles |
| 13 | Apply for the above job | |
| 14 | Job ID | 02-2274 |
| 15 | Job Title | Landfill |
| 16 | Job Description | Sort Metals |
| 17 | Location | Alexandria, VA |
| 18 | Pay Rate | $19.00 |
| 19 | No. of Hours | 7.5 |
| 20 | Date Time | September 3 2017; 8:00AM |
| 21 | Distance | 9 Miles |
| 22 | Apply for the above job | |

A

Available Workers – Small Screen

| | | | |
|---|---|---|---|
| 1 | 02-407 | Tuesday 09/19/2017. | 8:00AM Hours: 8. |
| 2 | Sort Workers By: | | |
| 3 | Application Order ▼  Sort Workers | | |
| 4 | | | |
| 5 | Worker ID: | 0102-0000-0982 | |
| 6 | Skills: | View Skills | |
| 7 | Distance: | 4 Miles | |
| 8 | Rating: | ★★★★ | |
| 9 | Reviews: | Very good worker | |
| 10 | Name: | Accept Eddy | |
| 11 | Worker ID: | 0102-0000-6432 | |
| 12 | Skills: | View Skills | |
| 13 | Distance: | 13 Miles | |
| 14 | Rating: | ★★★★★ | |
| 15 | Reviews: | Great worker | |
| 16 | Name: | Accept Fatuma | |

Available Workers (Large Screen)

| | | | | | |
|---|---|---|---|---|---|
| 1 | 02-4070 | Tuesday 09/19/2017. | | 8:00AM Hours: 8. | |

2  Sort Workers By:

3  [Application Order ▼] [Sort Workers]

| | Worker No. | Skills | Distance | Ratings | Reviews | Name |
|---|---|---|---|---|---|---|
| 5 | 0102-0000-0982 | View Skills | 4 Miles | ★★★★ | Excellent | Accept Eddy |
| 6 | 0102-0000-6432 | View Skills | 13 Miles | ★★★★★ | Very good worker | Accept Fatuma |
| 7 | 0102-0000-7082 | View Skills | 11 Miles | ★★ | New but will get there | Accept Mary |
| 8 | 0102-0000-0472 | View Skills | 6 Miles | ★★★★ | Great worker | Accept Tom |
| 9 | 0102-0000-0482 | View Skills | 9 Miles | ★★★ | Good worker | Accept John |
| 10 | 0102-0000-0742 | View Skills | 17 Miles | not rated | | Accept Susan |

FIG 6

Data Driven Interfaces For Time Schedule Display and Invoice

A — Verify Start Time

| 1 Details | 2 Scheduled | 3 | 4 |
|---|---|---|---|
| | | Start Clock For All | |
| Robina | 8:00AM | Start Clock | Edit |
| Wasswa | 8:00AM | Start Clock | Edit |
| Edmond | 8:00AM | Start Clock | Edit |
| Robina | 8:00AM | Start Clock | Edit |
| Susan | 8:00AM | Start Clock | Edit |
| Julius | 8:00AM | Start Clock | Edit |
| Mary | 8:00AM | Start Clock | Edit |
| Wasswa | 8:00AM | Start Clock | Edit |
| Edmond | 8:00AM | Start Clock | Edit |
| Robina | 8:00AM | Start Clock | Edit |
| Susan | 8:00AM | Start Clock | Edit |
| Julius | 8:00AM | Start Clock | Edit |
| Mary | 8:00AM | Start Clock | Edit |
| | | Edit Clock For All | |
| Return To Main Menu | | | |

B — Due Invoice

| 1 | 2 |
|---|---|
| Invoice Number | 01-6439700 |
| Invoice Due Date | 09-14-2017 |
| Job ID | 02-0034692 |
| Job Date | 09-14-2017 |
| Job Requestor | James Kakaire |
| Number Of Workers | 7 |
| Total Hours Worked | 56 |
| Pay Rate | $22.00/hr |
| Deposit Amount | $616.00 |
| Balance | $616.00 |
| Invoice Total | $1232.00 |
| Payment Method | 3 Account On File |
| | 4 Credit / Debit Card |

5 Invoice Details

6 Return To Main Menu

FIG 7

Data Driven Interfaces For Editing Hours Worked and Schedule Editing.

Job Posting User Interface

1. Press Here To Post A Job For
2. 
   - Construction
   - Warehouse
   - Industrial
   - Landfill
   - Moving
   - Driving
   - Carpentry
   - Electrical
   - PC Tech

OR

3. Post A White Collar Job For
4. 
   - Accounting/Finance
   - Administrative/Clerical
   - Managerial/Executive
   - Paralegal
   - Marketing/Sales
   - Graphic Design
   - Software Development
   - Database Development
   - Web Design

C

Invoice Adjustment User Interface

HOURS CORRECTION

Please Note: If hours are reduced, the worker may be contacted to verify before effect 1. Invoice Number
2. or enter job no or invoice no...
3. Edit Start Time
4. Edit End Time

OR

Enter A Promotional Coupon 5. enter coupon code...
6. Submit

Worker Settings and Change Company Profile

A

Default Settings

1. Job Settings:
   Notify me of jobs within: [25 Miles ▼]

2. ○ Only White Collar Jobs ●
   ○ Only Blue Collar Jobs ○
   ○ All the Jobs I Selected ○

Set Default Distance (radius)
   Radius: [15 Miles ▼] [Search]

3. Edit Job Choices:
   [show me the job choices]

4. View Jobs Worked On to Set Refs:
   [Select References]

5. Get Text Notifications:
   Whenever a job is posted ☑
   Whenever logged in ☐
   Disable Notifications ☐

6. Get Email Notifications:
   Whenever a job is posted ☑
   Whenever logged in ☐
   Disable Notifications ☐

7. Vibrate & Alarm:
   Whenever a job is posted ☑
   Whenever logged in ☐
   Disable Notifications ☐

B

1. | Users | Address | Phone | Account |

2. USERS ON THIS ACCOUNT

3. ID: 0202-0000-0742  Fatima Akilu  P: 240-333-4444  [EDIT]

ID: 0202-0000-0742  Susan Winifield  P: 240-333-4449  [EDIT]

ID: 0202-0000-0742  Thomas Wasswa  P: 240-333-4441  [EDIT]

ID: 0202-0000-0742  Mary Waters  P: 240-333-44443  [EDIT]

ID: 0202-0000-0742  Tom Zilinger  P: 240-333-4440  [EDIT]

ID: 0202-0000-0742  Malaika Nakaye  P: 240-333-4448  [EDIT]

Email support@digitalcloud.com to
(a) Delete these users,
(b) To change your name or
(c) Change your email on file,
Alternatively, you may utilize the contact us tab from the main menu. Have a nice day

FIG 8

Small Screen Dynamic Rating

A

B

C

Job Assignment Instructions Part I

| Job Info | Crew | Emergency Contacts |

1. Job Number 0342    Start Time 8:00 AM    Approx End Time 4:00 PM

2. 
   Company Name: Company Z
   Address: 23 Main Street
   City: Herndon
   State / Province VA
   Zip / Postal Code: 20192
   Floor: 2
   Suite: 7

[View Area Map]
   [Navigate]

3. 
   Contact Name: John Smith
   Contact Number: 540-320-2792 CALL

4. 
   Company Name: Company Z
   Address: 23 Main Street
   City: Herndon
   State / Province VA
   Zip / Postal Code: 20192
   Floor: 5
   Suite: 3

[View Area Map]
   [Navigate]

5. 
   Special Instructions
   Remember not to eat today in honor of your job 6. [Home]

FIG 12

Job Assignment Instructions Part II

| Job Info | Crew | Emergency Contacts |

1
Main Supervisor: John Smith
Contact Number: 540-320-2792 CALL

2
Supervisor 2: Mary Williams
Contact Number: 540-320-2792 CALL

3
| | |
|---|---|
| John Senior | 540-320-2792 CALL |
| Susan Winfield | CALL |
| Peter Kilema | CALL |
| Joseph Waters | CALL |
| Jonathan Myers | CALL |
| Angela White | CALL |

4
Vehicle: License No. XXX YYYY
Vehicle ID: 4539

5 Home

FIG 13

Job Assignment Instructions Part III

| Job Info | Crew | Emergency Contacts |

Sat Sep 02 2017

1

After Hours: John Smith
Contact Number: 540-320-2792 CALL

2

Vehicle Issues: Tim Edwards
Contact Number: 540-320-2792 CALL

3

Sales Issues: Fernando Sanchos
Contact Number: 540-320-2792 CALL

4

Dispatch: Abdulgani Waters
Contact Number: 540-320-2792 CALL

5

Warehouse: Maria Hernandaz
Contact Number: 540-320-2792 CALL

6

Safety: John Smith
Contact Number: 540-320-2792 CALL

Home

Algorithm To Accept Workers At a Job Site and Track Hours and Payment

User Interface for Religious & Political App Not Shown 4 quick survey questions 1. Sex M/F (radio)
2. Marital Status (radio)
3. Ancestry Country of origin (drop menu)
4. Age range: (radio)

under 18, 18-28, 28-38, 38-48, 48-58, 58-68, 68-78,

FIG 26 (WAS 15 COMTOOL)

Time Processing Start Time

Time Sheet (Day Begins)

Enter Job ID: 0321

(Retrieve Workers)

---

Start Clock

| User ID | First Name | Phone | Start Time | Start Clock For All Workers | |
|---------|------------|-------|------------|---------|---------|
| 004560 | John | 703-111-1111 | 7:00AM | Start Clock | Edit Start Time |
| 004561 | Monica | 703-111-1112 | 7:00AM | Start Clock | Edit Start Time |
| 004562 | Jeff | 703-111-1113 | 7:00AM | Start Clock | Edit Start Time |
| 004563 | Paul | 703-111-1114 | 7:00AM | Start Clock | Edit Start Time |

Edit Start Time For All Workers

Worker present but name not on list?

- Manually Enter Worker's ID
- Enter Worker's Phone Number
- Enter Worker's Start Time

[Add Worker To Sheet]  [Exit Without Action]

FIG 28

Time Processing End Time

Time Sheet (Day Ends)

Select Job ID ▽     0321

(Retrieve Timesheet)

Start Clock

| User ID | First Name | JobID | Start Time | End Time | Travel | Lunch | Accept For All |
|---|---|---|---|---|---|---|---|
| 004560 | John | 0231 | 7:00AM | 3:00PM | 0.00 | 0.50 | OK  Edit End Time |
| 004561 | Monica | 0231 | 7:00AM | 3:00PM | 0.00 | 0.50 | OK  Edit End Time |
| 004562 | Jeff | 0231 | 7:00AM | 3:00PM | 0.00 | 0.50 | OK  Edit End Time |
| 004563 | Paul | 0231 | 7:00AM | 3:00PM | 0.00 | 0.50 | OK  Edit End Time |

Edit For All

Manually enter total hours | From Date Pick | To Date Pick | 10 Hours | Submit

Rendered Vertical For Small Screen     Exit Without Action

FIG 29 (was 25 eworkers)

Worker Time Fix App

| # | Field | Time | |
|---|---|---|---|
| 1 | Ad (Announcement) | | |
| 2 | FACILITY NAME | | Today's Date |
| 3 | User Name : Shift | | |
| 4 | Clock In Time | 00:00 | EDIT |
| 5 | First Break Out | 00:00 | EDIT |
| 6 | First Break In | 00:00 | EDIT |
| 7 | Lunch Out | 00:00 | EDIT |
| 8 | Lunch In | 00:00 | EDIT |
| 9 | Second Break Out | 00:00 | EDIT |
| 10 | Second Break In | 00:00 | EDIT |
| 11 | Travel Time | 00:00 | EDIT |
| | Clock Out Time | 00:00 | EDIT |

FIG 30

Scheduler Mobile App
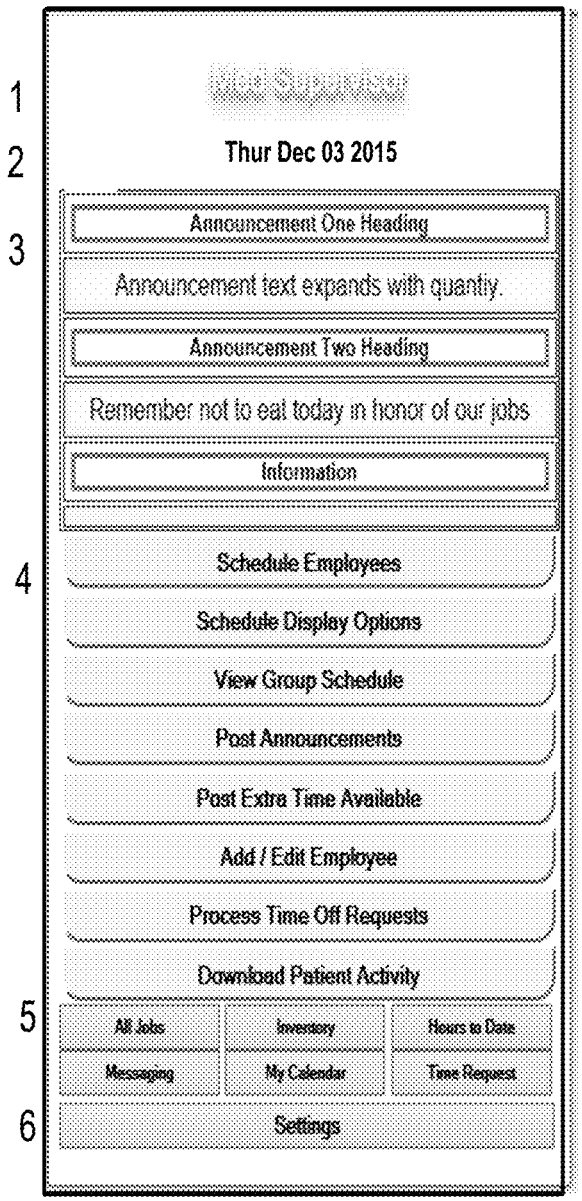
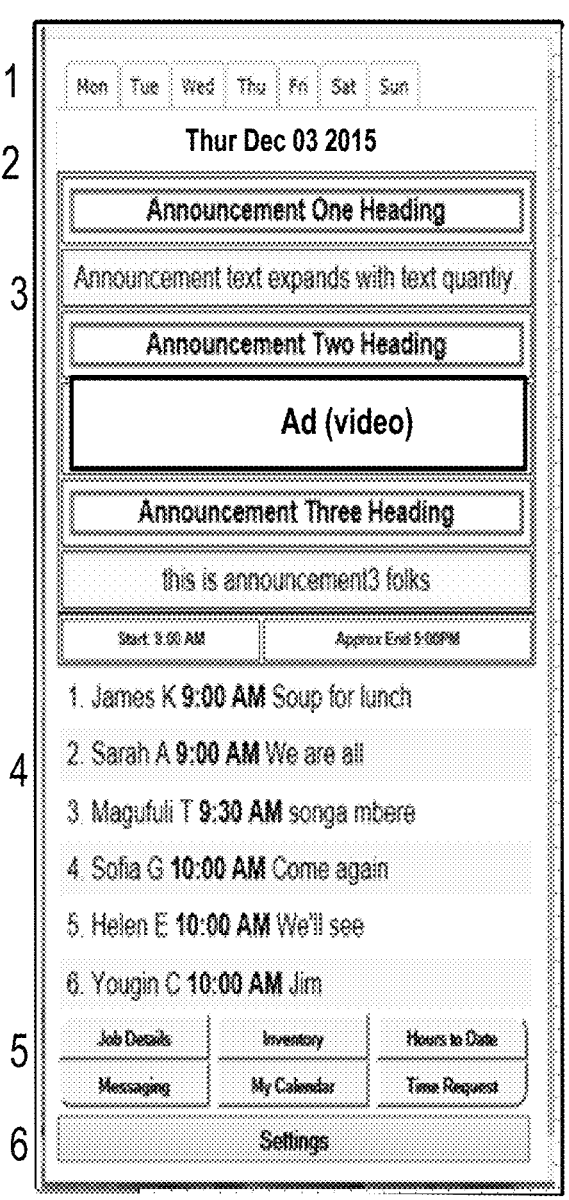
FIG 31

BUSINESS, JOBS AND RELIGIOUS APPS FRAMEWORK (BJRAF)

This patent application claims the benefits of provisional application No. 62/607,542, filed Dec. 19, 2017 and titled Business, Jobs and Religious Apps Framework (BJRAF). It was designed in 2014 but filed as a patent application in 2017.

FIELD OF INVENTION

Background

A system for providing modules to build and complete functionality of business Apps. The system provides a technology for electronic short term job processing which includes hiring and paying short term workers electronically on mobile phones and computers. A short term job app accessible by authentication on a mobile phone or computer provides graphical user interfaces that invoke algorithms. After authenticating a user on a mobile phone or computer, the algorithm displays departmental user menus. An algorithm for setting up accounts and controlling authentication by sending instructions to a processor that displays departmental menus enables users to execute instructions through button links. The system further enhance business applications by providing modules for software based phone tools, property management app, move tool app, communication tool app, financial records app and political groups Apps. It dynamically generates button links to automate processes including invoices for clients. An employer or client adds a backup employer or user utilizing a graphical user interface from a mobile phone app or website via a browser. The rating mechanism that utilizes a numerical method to assign percentage values to a graphical rating input enables worker selection based on competence. Instructions issued to a user's mobile phone or computer's processor via user interfaces as seen in FIGS. 1-14 invokes algorithms to read, process and save data to databases. Databases and files are saved and stored in a server memory. A mobile app in conjunction with databases authenticates short term workers on a mobile phone to a graphical user interface from where they access listings of short term jobs to apply to. The method of architecting database schemas in conjunction with algorithms also provides modules for building Religious Apps, Forums Apps and An App for workers to fix their times so as to reflect correct wage payments. The system architectures data in a database schema based on the entity relationship model that provides an implementation of a short term job application and a website authenticated through a user entity coupled to entities. This generates query statements for entering and retrieving data from the database on server memory and generates an Invoice entity record with invoice lines that corresponds to order lines the workers works on to compute hours worked and facilitate the time tracking mechanism and payment.

SUMMARY

The system facilitates software production by providing modules to various data driven mobile and Web based Apps populated with data from databases or file based records as the data source. Data structures are intermediary in populating the user interfaces and the data storage for these Apps. The dynamically generated button links are populated by data structures at runtime in all the applications.

The rating mechanism consists of an algorithm that rates workers, items and businesses FIG. 19. This authenticates an employer to display a job sign off and rating interface of FIG. 9 or FIG. 10. Upon rating of workers, the submit button on the interface transmits instructions in the algorithm to a processor to save the rating to a database on a server (FIG. 19: 10-13). Saving the rating (FIG. 19: 13) stores the rating as a number and displays the interface of FIG. 11A when a rating is positive and FIG. 11B when the rating is negative. The rating mechanism further consists of an algorithm that displays ratings to a user seeking final rating and review results FIG. 20. This algorithm reads workers (FIG. 20: 9) from the database on server into data structure(s) (FIG. 20: 10) and passes the data structure to a mobile phone app or computer front end and displays the workers (job applicants) along with the ratings. It converts the numerical values from the database to graphical equivalent (FIG. 20: 15) and displays it on the user device as seen in FIG. 5B on a mobile phone and FIG. 6 on a computer. The rating mechanism continues through paragraphs [091] [092] [100] and [086].

BRIEF DESCRIPTION OF THE DRAWINGS

FIG. 1(a) represents the a initial user interface or screen of a business Mobile App that requires authentication.

FIG. 1(b) displays when a user opens the Create Account button link. It provides regular data fields for registering a user but also provide additional fields which are phone number, password hint and secrete word for password reset and account management.

FIG. 5a represents a listing of jobs posted by employers and viewed from a Mobile App on a small screen.

FIG. 5b shows a listing of workers that have applied for a short term job. It also shows the job id, date and job start time 1.

FIG. 6 is the large screen version of FIG. 5b. it displays a listing of job applicants that have applied for a job and waiting to be accepted by the employer.

FIG. 7a represents the start clock menu of the time tracking mechanism that generates worker schedule based on records in a database or file system.

FIG. 7b represents a data driven invoice displaying on a mobile app.

FIG. 7C represents a user interface displayed when an employer selects the Post Job button link from their employer menu. Jobs are posted by category.

FIG. 7D is the user interface displayed when a user selects submit invoice adjustment from the main menu.

FIG. 8a represents the worker system settings screen.

FIG. 8b represents change of client company profile. From the customer main menu, a user hits change company profile and they get the user interface of FIG. 8b.

FIG. 10A displays graphical images horizontally and FIG. 10B displays them vertically. The dropdown menu 1 provides a list of items, individuals such as workers or businesses to select from for rating individually. The rater chooses one of the five star images to assign a numerical value to the rating of an individual, group or business.

FIG. 12 represents a user interface utilized by short term workers on a job. The Job Info tab displays information required to perform the current job. It defaults to a moving company or delivery but applies to all types of companies.

FIG. 13 is a continuation of FIG. 12. The tab labeled Crew provides contact numbers of coworkers on a specific project or job including supervisors as seen in section 1 and 2. The rest of the crew members are seen in section 3.

FIG. 14 is a continuation of FIG. 13. The Emergency tab of FIG. 14 displays vital contacts related to the job in progress.

FIG. 18b this algorithm adjusts time entries and process discount coupons.

FIG. 23 is a representation of forums, religious and political Apps characterized by a tabular display with a screen cell utilized for displaying textual, video and audio ads. Specific modules are used to control input and output in the App.

FIG. 28 represents a graphical user interface for starting time at a work site. It records start time and generates a time sheet from the individual and group buttons.

FIG. 29 is the end of day time recording user interface at a work site. It facilitates time entry for each worker and a group of workers at the beginning and end of day or week. Individualized buttons on a graphical user interface records the time for individuals and group buttons records time for groups of workers.

FIG. 30 is the user interface utilized by workers to edit their timesheet in a mobile app so as to reflect the correct hours and wage payments.

FIG. 31A represents a user interface utilized by a medical supervisor to schedule workers FIG. 31B displays the schedule for the workers and supervisors FIG. 32 displays a mobile app that is customizable. The scheduler is utilized for all jobs including medical staff, moving companies and restaurants.

DETAILED EMBODIMENT

Figure 1:
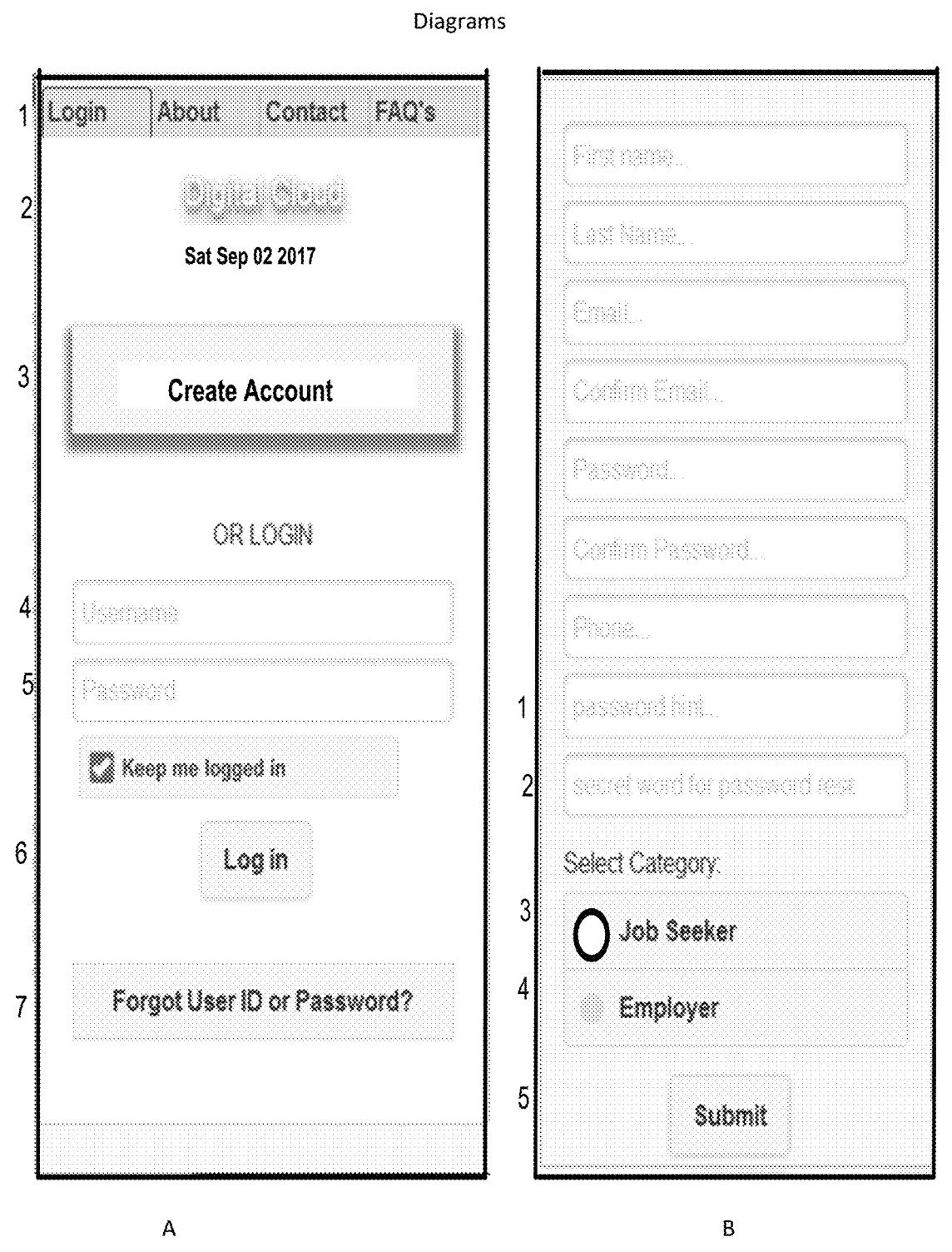

FIG. 1A represents an initial interface of a Mobile Phone App that requires authentication. It has a menu with four tabs namely Login which is the default with login fields. About which provides information about the company and Contact tab which provides a contact interface with contact phone numbers, text fields where users enter name, email, phone number and a message to request for information or a new account and a submit button followed by a live chart. The submit button transmits contents of the interface to a database on server. Sales agents and staff utilize a partial registration process to create a partial account through the contact interface. An authenticated admin user views and completes the partial account by giving it a title and saving the update to the database on server. The fourth tab FAQ's provides a button that connects to the server to display frequently asked questions. In some cases, the frequently asked questions are localized such that the user gets to them without connecting to the server.

Below the tabs is a title that represents company name or department. That is followed by date underneath. A button link for creating an account is provided for new users. This is followed by login and password fields that allow a user's login to be remembered. Finally, a user that has forgotten their user id or password is provided with a button link to reset password or fix user id.

FIG. 1B displays when a user opens the Create Account button link. It provides data fields for registering a user but also provide unique fields which are phone number, password hint 1 and secrete word 2 for password reset and account management. At the bottom of the user interface is a user category which allows the user to select the type of user they are such as job seeker (worker) 2 or employer 3. A new user interface is displayed to complete registration based on the options 2 or 3. Multiple user interfaces are provided for workers to fill in all required entries one after another. The worker main menu is displayed after the worker fills all the required sections which includes but not limited to personal info job history, work status, tax info, payment info, document upload. The algorithms that generates the account creation and password reset modules in this system comprises of a password reset method that displays a three tier password reset user interface (not shown) to simplify the password reset process wherein a secret word and password hint are utilized in graphical user interfaces to reset a password on the fly or send to email on file.

Figure 2:
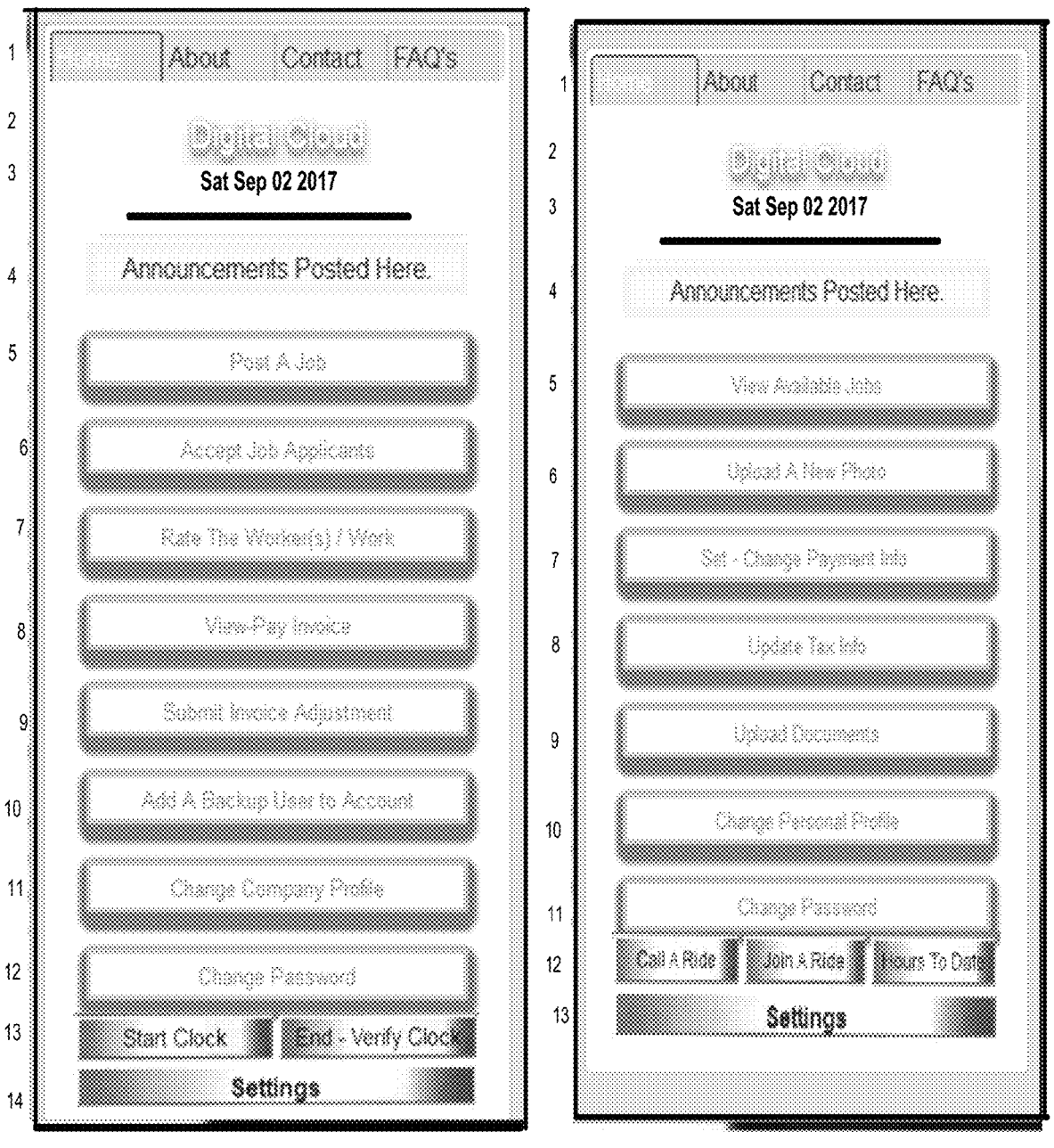
FIG. 2(a) represents the employer menu in the short term job app. This system provides departmental menus that are accessed based on user type at logon.
FIG. 2(b) represents the worker menu in the short term job app. At signup, workers register themselves in the system as users of type workers. They are granted worker privileges as displayed on the user menu of FIG. 2b.

FIG. 2A represents the employer menu in the short term job app

This system provides departmental menus that are accessed based on user type at logon. The menus differs based on type of business. Where clients are involved and all do the same things, a menu specifically built for those clients such as the one for employers in the short term job app is built. At registration, the algorithm of FIG. 15 that displays departmental menus identifies an employer as a user of type employer based on category selection from FIG. 1B saved to the database on server when creating an account or for an account to be created for them. They are established in the database or file system as user of type employer and granted employer privileges as displayed on the employer menu including posting of short term jobs. The algorithm identifies an employer as a user of type employer at logon and displays the departmental user menu that corresponds to employers.

Figure 4:
FIG. 4a is a user interface for posting resume based jobs from a small screen Mobile Apps. A similar interface is provided for large screens via a browser.
FIG. 4b is similar to FIG. 4a except that it is utilized to post non-resume jobs.

The Employer Menu provides buttons for tasks that include facilitating posting of short term jobs 5, accepting of job applicants 6, rating workers 7 and writing reviews on them, viewing and paying invoices 8, submitting invoice adjustment 9, adding a backup user to the employer account 10, changing company profile 11 and recording time or managing hours worked 13. Invoice adjustment includes discounts from coupons and erroneous data entries such as start time and end time. The menu provides a button for facilitating posting of short term jobs and this displays a new interface utilized by employers to enter details for resume based jobs from one tab and another tab for non-resume jobs FIGS. 4A and B. Collected data is submitted to save to the database on server as short term jobs. All button links provide new user interfaces.

The button links for managing hours worked on the employer menu processes start time of a job and end time of a job. These two button links displays additional menus with individualized buttons for processing and editing one worker at a time and buttons for processing several workers at once as seen in FIG. 7a.

FIG. 2B represents a worker menu tasks in the short term job app. At signup, workers register themselves in the system as users of type workers. They are granted worker privileges as displayed on the user menu of FIG. 2b. This menu displays ads or announcements in the window screen 4. If not ads, the screen collapses. Button links for viewing available jobs 5, uploading new photos 6, setting or changing information by which a worker is paid (change payment method) 7 are displayed in the system. The system further provides button links for updating tax deduction information for the short term job workers 8. It is by this information that taxes are deducted from the wages by the short term job App involved. The tax information entered by short term job workers in the system and percentage commissions determines how much is deducted from the worker wages. Gross wage is obtained from number of hours x pay rate. In one implementation, workers are charged a commission. Taxes and commissions are deducted from the gross wage to determine the worker's final electronic revenue.

Figure 3:
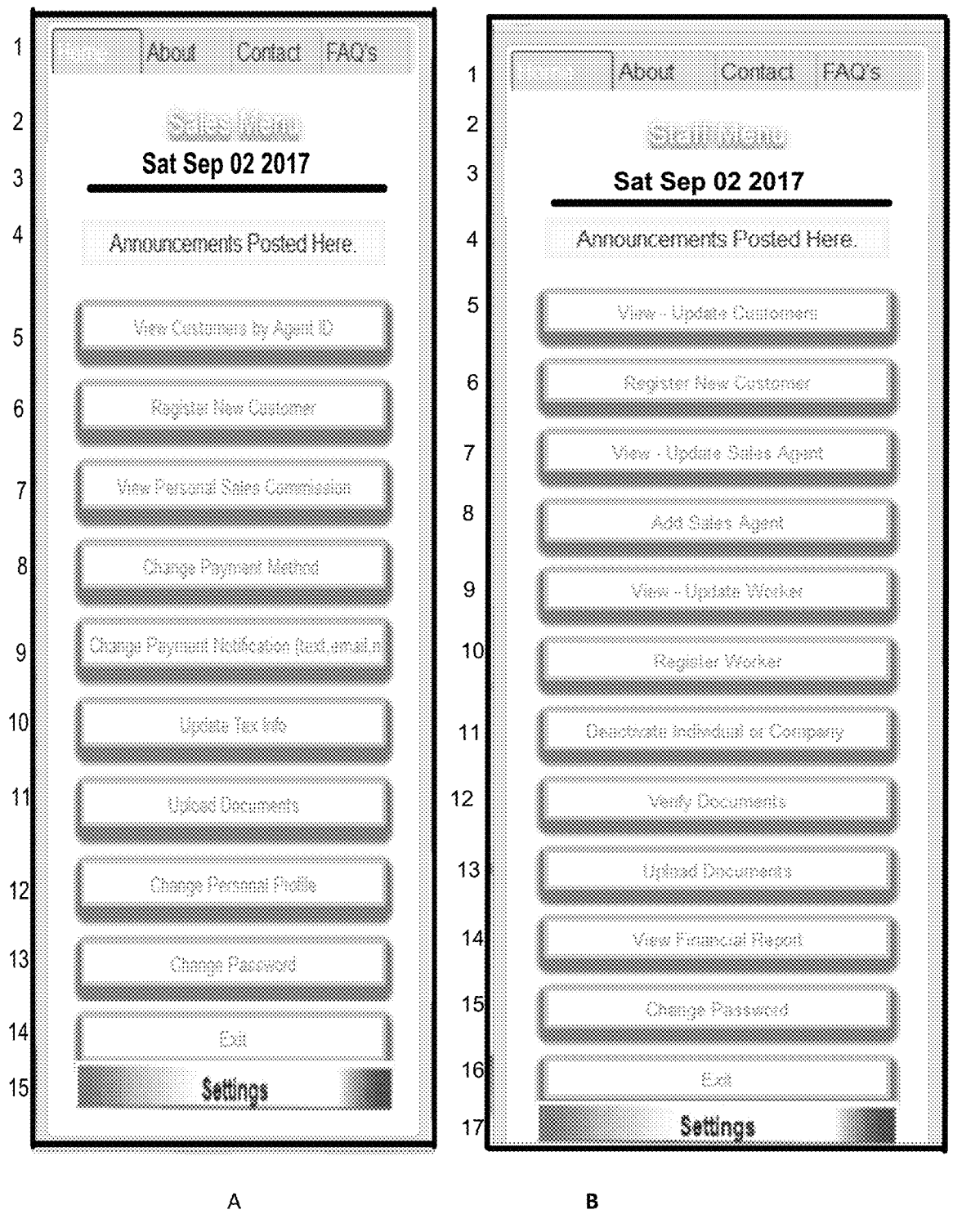
FIG. 3a is part of a departmental menu showing the sales department in a company such as the short term job processing App Company.
FIG. 3b provides a Graphical User Interface (GUI) displayed by authentication to staff personnel's for managing functionalities of a short term worker system.
Figure 9:
FIG. 9 is one of the three user interfaces utilized to rate individuals, items and businesses. The rating mechanism incorporated in the system evaluates items, individuals and businesses utilizing a numerical method that assigns a percentage number value to an input graphical rating and stores it numerically in a database or file.

The menu further provide button links for uploading documents 9 including driver license, pay stabs and resumes. Other button links enables the worker to change personal profile 10 and password 11. To change personal profile, like for all user types, a change mechanism provides a worker with a login prompt on a graphical user interface (GUI of FIG. 1) and [051] with a text field for a user name, a text field for a password and a submit button (login 6) which transmits instructions to the processor to invoke the algorithm of FIG. 15 to authenticate the user. Authentication displays a GUI menu in a tabular format with button links for change payment method, change tax deduction info, change personal profile FIG. 2B and FIG. 3A and others. The Change Personal Profile button link on a worker's menu (FIG. 2B), like the rest of the button links further displays a new GUI that provides text fields, dropdowns and a submit button (not shown) to change personal profile info on mobile phone or computer interfaces as seen in FIGS. 7, 8 and 9. The user personal profile info includes change of address, phone number and email account. The links for changing address, email and phone number are placed on a new GUI only to shorten the main menu but can be placed on the main menu. Employers change company profile in a similar manner as seen on FIGS. 2A and 8B. The submit button transmits instructions to to the processor to save data changes to a database in memory on a server (see [094]. The worker menu provides button links to facilitate shared rides with ride provider companies by electronically linking to the ride provider's software and accounts for fellow workers that provide rides to the same job site as the ride seeker. A ride seeker requests for a ride utilizing a button on the short term job Mobile Phone App interface.

At the bottom of the mobile phone app interface, there is a button 12 for initiating a ride with ride provider companies or fellow workers. Another button link 12b (not labeled) facilitates the process of joining a ride share already initiated by someone else in the mobile phone app. The buttons submits instructions to the processor and cause it to retrieve ride information by providing the user id and related job id as variables to the database query in server memory. Next is a button link that gives a worker a snapshot of the hours they have accumulated to date 12c (not labeled). Finally, the settings button 13 provides a user interface from where a user sets job notifications, edits job choices and sets type of notifications including email, sound alarm and vibration of a mobile device.

For workers to view the user menu in FIG. 2B, they have to complete all the required data entry which includes work history, tax deduction options, payment options, work status such as work authorization, and so on. These are uploaded independently. The button links submit instructions to a processor to save and retrieve data from a database in server memory. Each step completed is not showed again. The next time the worker tries to log on, they get a menu for completing what they are left with to complete. Once they are done with data entry which is verified in the entity account Setup, the main menu is displayed. The attributes that have to be cleared are as listed in the account Setup entity.

FIG. 3A is part of a departmental menu showing the sales department in a company such as the short term job processing App Company. The departmental menus provide a client menu utilized by the sales agents. Users are identified by user type. Sales agents provide a sales identity to authenticate to the sales menu.

The Sales Menu provides options for sales agents to view their customer companies utilizing sales agent id 5 by authentication. From the menu, they have a button link for registering new customers 6, view personal sales commission 7 and update their financial profile 8. Here they change methods by which they are paid. The change payment method includes direct deposit, pre-paid cards, electronic check or location pickup. If they wish to be notified when a payment is ready, they chose from text messaging, email or none 9. The sales agents like all recipients of money from the system updates tax information 10. However, the sales agents have an option not be taxed by the system so that they pay their own taxes in full to the government.

The button link 11 enables sales agents to upload documents and 12 to update personal profiles. The change password, settings and exit button links are on all user menus by default.

The menu based system compensates Sales Agents with a pre determined percentage commission viewable when they are authenticated.

The user menu in the system provides sales agents with options to audit their pre-determined commission from within the system. Upon opening the menu option for viewing their commission, they get summary of their client companies linked to workers that perform duties for the companies each time. The transactions conducted over a mobile app or website are tabulated by day, by month and year.

The sales rep id is utilized to identify the companies and workers they bring on board so as to compute their commission.

FIG. 3*b* provides a Graphical User Interface (GUI) displayed by authentication to staff personnel for managing functionalities of the short term worker system. The staff view and update customers 5, register new customers 6 and view or update sales agents 7. Under button link 8, they add new sales agents, view or update workers 9 and register new workers 10. The user of type staff deactivates individual users or companies 11, verify documents 12 and uploads documents 13. They also view financial report under button link 14, change password 15 or exit 16. Finally, they set the way their user interface works in the App 17. This is interactively accomplished from a Mobile App or website. However, a command line based interface if desired can also be linked to the data source to accomplish input and output of data. Data source in this application refers to a database or file system.

FIG. 4A is a user interface for posting resume based jobs from a small screen. A similar interface is provided for large screens. The text field 1 takes the job title and the text area 2 takes the job description. The employer then selects a job category 3, job start time 4 and end time 5. They provide duration of the job in terms of days weeks or months 6. Radio buttons not showed to the right of 6 or below selects between the days, weeks and months. Employers provide the job city 7 and job state or province 9. In the text field 10, the employer provides the zip code of the job site address.

The menu button labeled terms of payment 11, provides periodic payment options for disbursing funds to workers including hourly, weekly, bi-weekly or per project. The employer or payer selects one option to apply to the project they are posting. Funds are disbursed to workers by direct deposit through their bank accounts, electronic check, pre-paid debit card or location pickup. The employer then posts the pay rate in text field 12. The submit button 13 sends the User Interface contents to the server to save.

FIG. 4B is similar to FIG. 4*a* except that it is utilized to post non-resume based jobs. The main difference is that in FIG. 4*b*, a full job address 4-7 is provided and job start date 8 and job end date 9 are provided. Job start time 10 provides a drop down menu from which time is incremented at least 15 minutes for the 24 hour period. Terms of payment 11 provides for user to choose hourly, weekly or per project. Hourly pay rate 13 is a dropdown from which users select the amount they are willing to pay the workers. This is also available as a text field 14 from where employers that want to pay weekly or per project can just type in the numbers. When used for weekly and project rates, the text field is hidden until the employer selects terms of payment as weekly or per project. The button link at the bottom is the submit button. The collected data is submitted to save to a database on a server.

FIG. 5A represents a listing of short term jobs posted by employers and viewed from a small screen utilizing a mobile app. The title 1 informs the user what the current interface does. The worker selects a starting point 2 which can be either a home address or location where they are currently applying from. The user adjusts the number of miles they are willing to travel 3 which are indicated as radius. They also have an option for sorting jobs by title, start time, pay rate, distance from home or current location, required skills, city and other factors 4

When a user selects a listing of jobs by city, a new search field displays to enable them enter a city of choice which is auto completed. Locations 5-12 displays job id, title, job description, location, pay rate, number of hours, date and start time, and distance from home or current location. The button link 13 enables the user to apply for the job from a small or big screen.

Users create accounts providing a home address. The system that lists jobs for workers utilize that home address or user's current location to determine the jobs to be listed for that particular user in addition to skills provided at registration.

FIG. 5B shows a listing of workers that have applied for a short term job. It also shows the job id, date and job start time 1. It allows the employer to sort workers 2 by order in which application is received, ratings, reviews, skills or distance from the job site 3 and whether the worker has ever worked for that employer not shown. The skills button 6 and reviews link 9 are displayed as button links or just regular anchor links which provides details upon opening and expansion. The accept worker name button 10 combines a first name and submit button in one to save space. Alternatively, the actual name is placed in that row and the accept worker button is placed at the bottom for a better look. The skills, reviews and name button links are populated from the data source to provide actual records.

Not shown is the total number of workers and the button to accept all workers at the same time instead of one at a time.

FIG. 6 is the large screen version of FIG. 5B. it displays a listing of job applicants that have applied for a job and waiting to be accepted by the employer.

It shows the job id, start date and start time 1, option 2 for sorting workers by application order, skills, rating or distance completed in step 3. It displays a worker ID 5 and the skills button 6 which expand upon opening to display skills.

Additionally, it shows a title line 4 which gives titles to worker number, worker distance from the job site 7, ratings 8, reviews 9 and the name button link 10 for accepting the worker.

The skills and reviews are read from a database into a data structure then from the data structure onto the display of a mobile device (mobile phone or tablet) or browser screen [to 130: 29-32]. Each skill and review corresponds to a record of the selected worker. Not shown is the total number of workers and the button to accept all workers at the same time instead of one at a time.

FIG. 7A represents the start clock menu of the time tracking mechanism that generates worker information based on records in a database or file system. Not shown is a dropdown menu for selecting a job if a user has more than one jobs or when the job is continuing from the previous day. Upon opening the user interface of FIG. 7, a list of accepted workers (scheduled workers) is displayed showing a column of worker name(s) titled Details with a worker picture (not shown) under the name button link 1. It shows another column displaying scheduled start time 2 and a column 3 with button links for starting the time individually for each worker. Each button is connected to a record of a single worker. Start time is started individually for each name using the corresponding dynamic button that starts the clock for that person. Another column 4 is displayed to allow editing of workers start time individually. Each worker record has a corresponding name detail with a worker picture, time that worker is scheduled to start working, a start clock button link that registers the particular worker's start time and the edit start time button link for editing and registering start time for the worker in that row. Not showed is a worker phone number also for facilitating communication between the worker and employer.

A single button link 3 is provided for starting all workers at the same time and another button link 4 edits workers start time in one event other than individually. The last button link at the bottom returns the user to the worker main menu.

A similar menu for ending the clock is not showed to save space in the application. The time ending menu also provides data driven button links showing a picture of a worker where the worker name button is located, time the worker is scheduled to stop working, a stop clock button link for each worker, an edit stop time button link for each worker, a stop clock button link for the entire group of workers for stopping them at the same time and an edit stop clock for the entire group of workers if stop time is the same for all the workers.

By default, if the employer does not enter start or end time using the dynamic buttons, the system assumes the scheduled start time and stop time entered during posting of the project or job. The employer can correct this later by submitting invoice adjustment. The invoice adjustment may correct the hours worked, take a monetary amount as a discount or take a coupon.

The system provides start clock and end clock button links for starting and ending work time respectively. Hours worked by short term workers are calculated from the end time and start time to determine wages. If the employer doesn't enter start and end time, the values entered when posting the project are used until the employer or worker submits an invoice adjustment or change of hours.

FIG. 7B represents a data driven invoice displaying on a small screen. It displays contents of an invoice represented by columns 1 and 2. It provides a choice of payment method 3 which is an account on file or 4 which is a different account such as credit or debit card that the user can enter at that time. The button link 5 provides invoice details that are secondary. On this interface, invoice number, invoice date, job id, job date, job requestor, number of workers, total hours worked, pay rate, deposit amount, balance, invoice total are displayed on the mobile app or browser. The user is provided with an option to utilize the account on file 3 or use a credit card 4. The data driven button links generated along other textual record data in the mobile app system displays invoices linked to the authenticated customer record and payment account details at runtime. It facilitates the processing of financial records relating to short term job payments and other payments wherein invoice linked to an account on file or a new payment method including debit or credit are paid.

Not showed are the options for paying installments. Installments are indicated by a dropdown menu or radio buttons. When a user pays the entire amount as the first installment, the reminder of the installments are that could be 2 or more are set to zero and auto paid when their due time comes.

The system sets a method of paying an invoice in installments but a user selects how many installments they want to pay. Paying off the amount earlier sets all partial payments to paid. Partial payments may correspond to milestones in a project and determines the project progress. Whenever a partial payment or installment is made, the responsible parties working on a project are automatically notified to continue with the project without halt.

FIG. 7C represents a user interface displayed when an employer selects the Post Job button link from their employer menu. It provides an option for posting blue collar jobs that don't require resumes and another option for posting resume based jobs. Alternatively, one button link is provided to post blue collar jobs and another to post white collar jobs from the employer menu. However, separate apps are deployed one for blue and the other for white collar jobs.

FIG. 7D is the user interface displayed when a user (employer) selects submit invoice adjustment from the main menu. The user can change start time, change or edit end time of a worker or group of workers and can also enter a coupon to get a discount. A separate mechanism is utilized by workers to edit their hours worked to reflect a correct time sheet. The user either selects invoice number from a dropdown menu 1 or enters it in a text field 2. Hitting Edit Start Time 3 submits the invoice number and user id for comparison to the stored data related to that invoice. That is, stored invoice number, job number, user id and worker id involved. After a match on all, the job number is utilized to display a GUI for recording start time. Edit End Time 4 displays the GUI for editing end time. Time adjustments are recorded and the invoice is recalculated. If the user's choice was that of a coupon, they enter the coupon code 5 and hits submit 6. The coupon value is then applied to the invoice. The invoice payment of the system provides an option for submitting an invoice adjustment to correct an error or provide a discount by entering a code or actual monetary amount or hours worked via a graphical user interface on a mobile app as well as a browser based application. It sets partial payments to project invoices as installments periodically payable wherein the partial payments determine project progress by alerting consulting managers.

FIG. 8A represents the worker system settings screen. It is divided into parts that accomplish different tasks. The job settings section on top has a dropdown menu 1 that selects the distance the worker is willing to travel from their comfort home or current location under which they can be notified of new jobs. The second part of the job settings provides choices to the worker to select either a listing of blue collar jobs, while collar jobs or both.

This is followed by a section from where the worker selects the default maximum distance under which they travel 2. Section 3 displays job choices that the worker made at registration or later. They can edit the choices here.

A user settings menu is characterized by options for selecting specific job assignments and corresponding supervisors as the references seen by future employers. Whenever a worker is rated well on a job with five stars, they are provided with a button link 4 that requests the employer that rated them if they can add the employer to the list of references. If the employer accepts, they are automatically added and other employers can see the reference and contact the rating employer if they want to.

When a worker want to get notified by text messaging, they choose section 5, if they want to be notified by email, they choose section 6 and when they just want their device to vibrate or set a phone alarm, they choose section 7.

FIG. 8B represents change of client company profile. From the customer main menu, a user hits change company profile and they get the user interface of FIG. 8*b*. The first tab shows users on the client account as indicated in the title 2. They perform client duties such as hiring workers or other. Those users are referred to as backup customer users or backup admin users. A client with admin rights adds and deletes the backup customer users. The client gives backup admin users lesser rights or same rights as what they have depending on job responsibility. Clicking the Address tab or Phone tab or Account tab on FIG. 8 provides text fields and submit buttons to transmit data changes to a database in a server memory. The client can request removal of these users or add new ones utilizing a button link. They can also request change of name and email. The next tab Address, allows the client company to change the billing address and any other info that may need changing. A third tab labeled phone is utilized to change the contact phone numbers on file and the last one Account enables the user to change payment account information and email. Alternatively, the links for change of address, phone and email are placed on a user's home menu.

FIG. 9 is one of the three user interfaces utilized to rate individuals, items and businesses. The rating mechanism incorporated in the system evaluates items, individuals and businesses utilizing a numerical method that assigns a percentage number value to an input graphical rating and stores it numerically in a database or file in server memory. When an item is selected from a dropdown menu 1 or obtained through a search field 2 or displayed by default as a single item, it displays related details on a screen 3 for a rater to ensure they are the right choice to rate. In this case of FIG. 9, it is a job performed by movers showing the job number, move date, move time and end time. The rater has selected a value of 4 images (stars). The job is rated 4 out of 5 stars and the number 4 is stored in the database or file system along with comments or reviews. Each rating adds to the previous one. Data is passed to and from the data storage (database/files) through data structures such as arrays, array lists, maps, linked lists etc.

A group of items or workers is by default rated as a whole unless when the user selects individuals.

Figure 11:
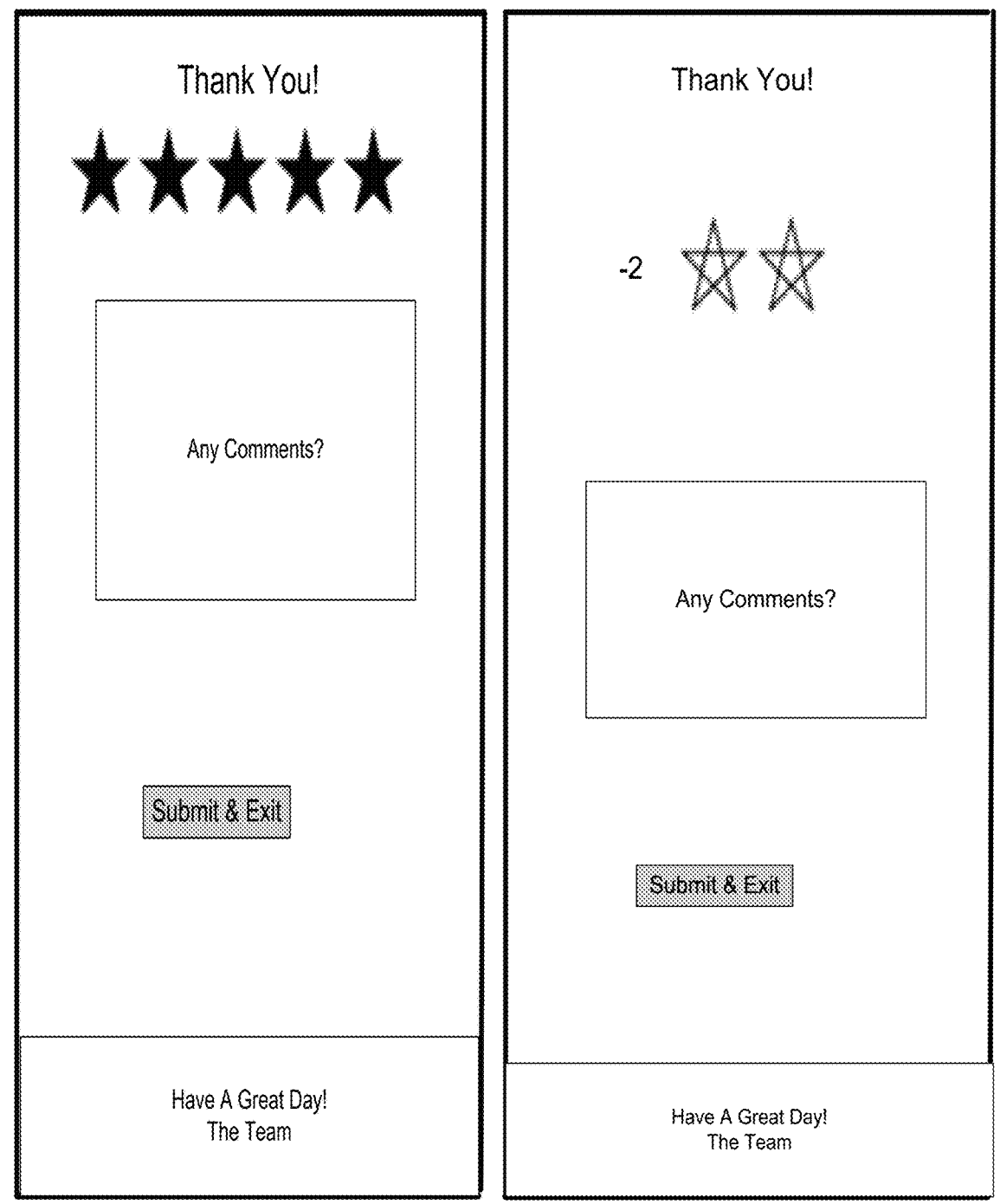
FIG. 11a represents a final rating given to a worker, item or business graphically. When the user submits a rating, a new screen displays the number of images provided in the rating by that user. A good rating displays the actual number of images (stars) with solid colors as seen in FIG. 11A. A bad rating displays two negative stars in colors that are not solid.
FIG. 11b refers to a negative rating when the item, person or business being rated is considered really bad. A special button link is utilized to deduct points from the total points the item, business or worker has accumulated.

To show ratings, the rating mechanism in this system extracts a numerical value (accumulated running total) from a data storage source (database or file) and passes it to a module that converts it to dynamically generated graphics equivalent to the assigned percentage. It is displayed to a user seeking ratings and reviews on a new graphical interface of FIG. 11. Taking 59 percent to the module as input returns two images (stars) based on the 20 percent rating for one image. The comments or reviews are displayed as links that are further opened to read details. Though displaying images are drawn in real time, actual static images are utilized in another implementation. One method draws svg buttons and the other utilizes actual images.

Since 5 stars are used here, we evaluate each star at 20 percent and this is equivalent to one star or image to display for those looking for ratings and reviews. A numerical sum of 80 out of 100 displays four stars. The rating mechanism provides a worker rated with a five star rating an option to request the employer that gave the five star rating to be added to a group of possible references seen by future employers for referral contact. References are stored as links to the corresponding employer that accepts to be referenced.

The comment field 5 takes in user comments for saving as reviews which are extracted along with the numerical percentage value for display to another user. The submit button 6 sends the comments to storage to be saved and the home button 7 takes the user back to the main menu.

In the worker version of Edit Profile, the worker changes personal info which includes address, phone, email, skills update, jobs desired, add new resume, delete old resume, add place of employment and add or upload pay stubs.

Figure 10:
FIGS. 10a, 10b and 10c are other representations of FIG. 9.

FIGS. 10A, 10B and 10C are other representations of FIG. 9. FIG. 9*a* displays graphical images horizontally and FIG. 9*b* displays them vertically. The dropdown menu 1 provides a list of items, individuals such as workers or businesses to select from for rating individually. The rater chooses one of the five star images to assign a numerical value to the rating.

When they select the first image, it gives a value of one and the last image gives a value of 5.

This rating method also exhibits a rating button link that gives a negative rating to subtract points from accumulated points in the database or file system if the item or person being rated is really bad. The bad worker button 3 takes points from the person, item or business being rated. In this case we set 2 points but it can be any number of points. Images are displayed from the final points after summing up.

FIG. 11A represents a final rating given to a worker, item or business graphically. When the user submits a rating, a new screen displays the number of images provided in the rating by that user. A good rating displays the actual number of images (stars) with solid colors as seen in FIG. 10*a*. A bad rating displays two negative stars in colors that are not solid. Under this scheme, we utilized five images of type star. When rating, each star carries a numerical value which ranges from 1 to whatever is decided at that time. At the moment, each star image carries a numerical value of one (1). When rating of one star is given, it takes a numerical value of one. Two stars takes two and five stars take five. The new display with graphic images is characterized by a text area for entering reviews or comments about what is being rated.

Regardless of how many star ratings are given, the numerical value is added to the accumulating (running total) and the actual numerical rating is saved as a standalone in reference to the project the worker worked on in case of a worker.

When a rating of five stars is given, it displays the five stars on top and provides button link for the rated if a worker to add the rater to the group of possible references. If the rater accepts, they are automatically added to the group of references the worker can count on. These references stored as links to the corresponding supervisors in the system, becomes visible to other employers if the worker choose to make them visible through the settings. The supervisors can be accessed after that. At any given time, the worker can set all their five star employers as references by requesting them. They can also remove some of them at any time.

FIG. 11B refers to a negative rating when the item, person or business being rated is considered really bad. A special button link is utilized to deduct points from the total points the item, business or worker has accumulated.

Grayed out graphics 1 are displayed on top to show how many points are deducted from the accumulated total. A numerical value may also be displayed in some cases. This is followed by a text area 2 for comments or reviews. The submit button link 3 saves the comments for reviews.

FIG. 12 represents a user interface utilized by short term workers on a job. The Job Info tab displays information required to perform the current job.

If necessary, contact email is included. The first part 1 displays the job number, start time and approximate end time. Part 2 shows name of the company and the addresses involved including the floor and suite. It also provides area map and navigation from one address to another if travel is involved. The contact person for the job and their phone number are provided as seen in the UI 3. Section 4 shows details of another company in case there is another assignment. If there are any special instructions relevant to the job, the instructions are entered to the server and retrieved by the app as seen in section 5. The button link 6 takes the worker to their home menu.

FIG. 13 is a continuation of FIG. 12. The tab labeled Crew provides contact numbers of coworkers on a specific project or job including supervisors as seen in section 1 and 2. The rest of the crew members are seen in section 3.

The data driven button links in the modules display names phone numbers and other data in the worker Scheduler App. When the underlying numbers are changed, the app is not affected because it only reads from the data source namely database or file system and embed the numbers and names in buttons. Not showed are the pictures of the people to contact from the phone numbers. A phone number may display on top of or under the picture or may not display basing on company policy. When there is a company vehicle involved, it displays in section 4. The home button 5 takes the user back to their worker home page.

FIG. 14 is a continuation of FIG. 13. The Emergency tab of FIG. 14 displays vital contacts related to the job in progress. One may view a number and type it in their phone to call or press a call button and call directly from the application. The personnel involved includes 1 after hours, 2 vehicle issues, 3 sales issues, 4 dispatch problems, 5 warehouse and 6 safety. The home button link takes the user back to their home page. Not showed is the tab for live chart messaging.

Figure 15:
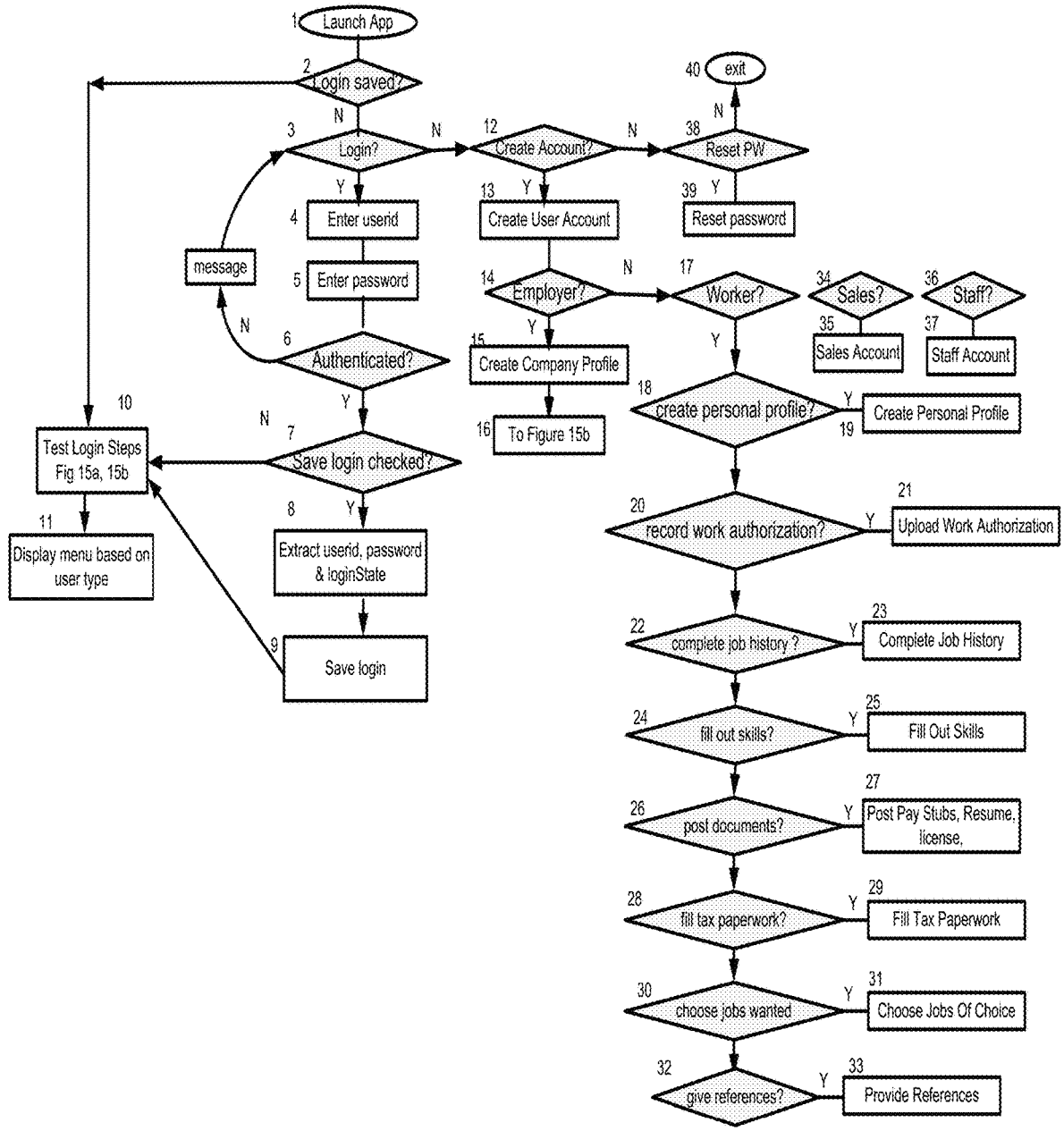
FIG. 15 is the algorithm that controls the initial user interface. It creates a user account, provides option to login and an option to reset user password. It extends into FIGS. 15a, 15b and 15c.

FIG. 15 is an algorithm that controls an initial user interface. It creates a user account and provides an option to login. The algorithm controls authentication by displaying the user interface of FIG. 1A which provides four tabs including About, Contact Us, FAQ and a login tab with an option to create an account, an option to login, a check box to keep a user logged in after authentication and a log in button that submits a user name as email or phone number and password to authenticate, It also provides an option to reset user password. It extends into FIGS. 15*a*, 15*b* and 15*c*.

At launch of the App 1, the algorithm invokes a user interface that provides a text field for a user name in form of email or phone number, another text field for password and a submit button for a user to login. The submit button causes instructions to be transmitted to a processor to authenticate the user from a database on a server. It authenticates a user on a mobile phone, tablet or computer that interacts with a database in server memory. It checks to see if the user login was saved either locally or on the server 2. If the user login was previously saved, and the algorithm authenticates the user onto a departmental user menu after testing login, steps 10. The departmental user menu is then displayed based on user type 11. If at step 2, the login was not previously saved and the user wants to login 3, they enter user name 4 in form of email or phone number and password 5. When authenticated 6, the algorithm tests for checked login option the option for saving the login permanently 7. The algorithm extracts the user id, password and login State (login saved or not) 8. After the login is saved 9, the algorithm tests for account setup steps 10 which ensures all short term worker requirements are met before they proceed to the main departmental menu 11. The departmental user menu displays on a mobile device or computer in a tabular format with button links for opening new interfaces that accomplish a employer menu tasks or worker menu tasks and other user tasks as seen in [054] and elsewhere in the specification and drawings.

If at step 3 a user selects an option to create an account 12, they create a system authentication account 13 by hitting the create account Button link labeled 3 on FIG. 1A. The Create Account button link displays a second user interface showed in FIG. 1B with text fields and a submit button for the user to enter an email and phone number to create an account. In addition, the user interface provides an option to choose between employer and a worker account. If the option is employer 14, the user continues to create a personal and company profile 15. They are directed to the user account setup completion test 16 which continues through FIG. 15*b*.

If at step 14, the user is a worker 17, the worker option 18 creates a personal profile 19 from which option 20 the user uploads identification and work authorization documents 21. They are also provided with option 22 from where they complete their job history 23, option 24 from where they fill out their skills 25, option 26 from where they post documents such as pay stubs, resumes, cover letters 27, option 28 with a button link from where they fill the tax information for short term job workers 29 wherein taxes are deducted from the wages based on worker settings and percentage commissions at the time hence determines the worker's wages. Option 30 from where they choose the desired jobs 31 and option 32 from where they provide references whether personal or professional 33. The submit button on each user interface involved causes instructions to be submitted to a processor to save the collected data to database in a server memory. If at step 17, the user is a sales agent 34, they complete their sales account initiated by staff 35. If the user is staff 36, they complete their staff account 37 initiated by management whose steps are not shown on the flow chart. A sales agent 34 and staff 36 (showed detached from the Create User Account button link of FIG. 15) submits a user account request by entering name, email and phone number in an interface of the contact tab to create a partial account profile with name, email and phone number in a database on a server. If at step 12, the user only wanted to reset their password 38, they are provided with a graphical user interface 39 to reset password or exit 40. Account setup requirements for short term workers includes create personal profile, job history, work skills, upload documents including picture id such as license, select job types desired, post pay stubs or resume, post tax info, references and provide work authorization documents.

Figure 15A:
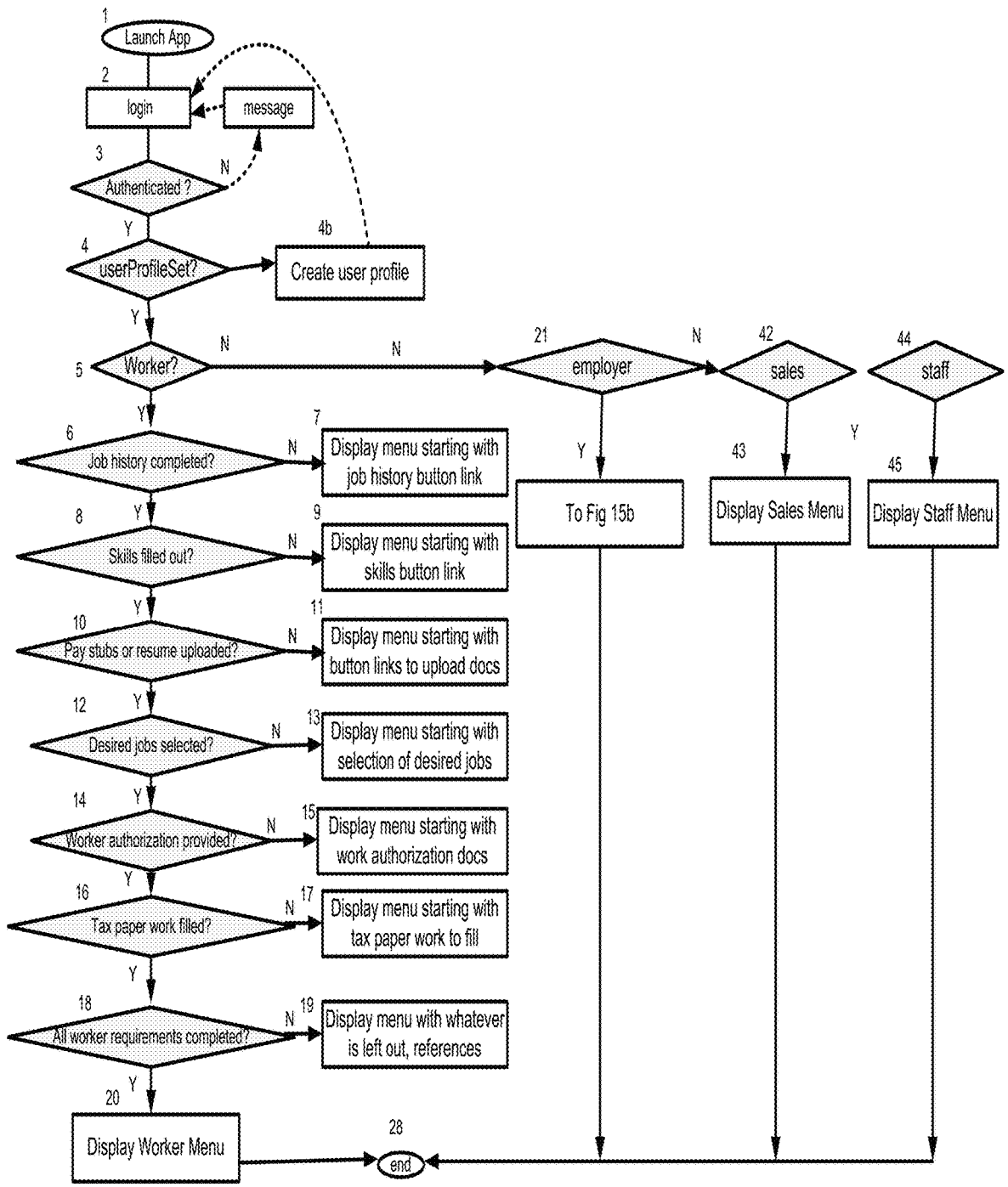
FIG. 15a represents an algorithm that displays user menus in this system. The departmental user menus display in full when account setup requirements are complete.

FIG. 15A represents an algorithm that identifies users by user type to display user menus in this system. The departmental user menus display in full when account setup requirements are complete. The account setup requirements for a worker includes entering job history 6, skills 8, pay stubs or resume 10, desired job 12, work authorization 14 and tax paper work 16.

The algorithms provides departmental menus utilized by various types of clients including employers menu, workers menu used by workers only, a sales menu utilized by sales agents, a staff menu utilized by all staff and an admin menu utilized only by application administrators and management wherein users are identified by user type to authenticate to a particular departmental menu which displays in full when account setup requirements are completed. The account setup process tests for user type and account setup completion each time a user logs on 1-4. The system provides departmental menus including a client menu utilized by all clients such as employers, a worker menu used by workers, a sales menu utilized by sales agents, a staff menu utilized by staff and an admin menu utilized by application administrators and management. Users are identified by user type to authenticate to a particular menu that corresponds to the type of client logged in.

The user launches the App 1 and logs in 2. When they are not authenticated 3, they receive a related message 3b provided with the login screen again. When they get authenticated, the system tests to see if they have a user profile created 4. If not, they are provided with a user interface to create a profile 4b. If the user is a worker 5 they are tested for account setup completion before they continue to the worker main menu. The menu is not necessary arranged in order of the algorithm.

Step 6 tests for completion of job history section, if not completed, the user is directed to a menu 7 that starts with job completion and display everything else they have not completed. If the skills section 8 is not completed, the user is directed to a menu that starts with filling out of the skills section 9. If the required work related documents such as pay stubs, resume or identification license is not uploaded 10, the user is sent to a menu from where they can upload those documents 11. If desired jobs are not selected 12, the user is directed to a menu that displays all jobs for them to select desired jobs 13. If worker authorization is not provided 14, the user is referred to a page from where they can fill work authorization 15. If tax paperwork is not filled 16, the user is directed to a page from where they can fill tax paper work to completion 17. If any other work requirement is not completed 18, the user is directed to a page or menu that provides them with an option to complete that requirement 19. The requirements include references which are included in step 19 of the flow chart. If all requirements are completed 20, the user main menu is displayed giving access to all functionalities of the worker in the system.

If the logged in user is nota worker but an employer 21, they are also tested for account completion which looks for all registration requirements including company name, billing address, contact person, contact phone number and email 22. Once those are completed, the employer menu 23 is displayed to the user. The algorithm provides button links for the employer menu to facilitate posting of short term jobs, accepting of job applicants, rating of workers and writing reviews on them, viewing and paying invoice, submitting invoice adjustment, adding backup users to the company account, changing company profile and managing hours worked.

If the logged in user is not an employer but a sales agent 42, a sales mechanism for linking client companies and workers to compensate the sales agent with a pre-determined percentage commission viewable by authentication on a mobile phone, tablet or computer, authenticates the sales agent to a menu interface utilized by sales agents 25. The sales mechanism consists of elements and steps listed in [050]. This provides button links to facilitate functions of the sales agents including viewing of customer (client) companies by authentication utilizing agent login id, registering new customers to the system, viewing personal sales commission, changing methods by which the sales agent is paid (payment method) to include one of direct deposit, pre-paid cards, electronic check or location pickup and other financial information, changing payment notification, update tax deduction information, upload documents, changing a personal profile and change password wherein sales agents are compensated with a pre determined percentage commission viewable by authentication and electronically payable though it can be mailed as well. Workers that work for companies signed up by a sales agent are tied to that sales agent and the company they work for utilizing user id to determine sales compensation. The user menu provides sales agents with options to audit their pre-determined percentage commission from within the system wherein client companies are linked to workers that perform duties for the companies signed up by the sales agents. Transactions conducted over a mobile app or website generates the percentage commission.

If the user happens not to be a sales agent but a staff member 26, the staff menu 27 is displayed and that marks the end of displaying menus 28. The algorithm here provides button links as seen in the graphical user interface of FIG. 3b.

Figure 15B:
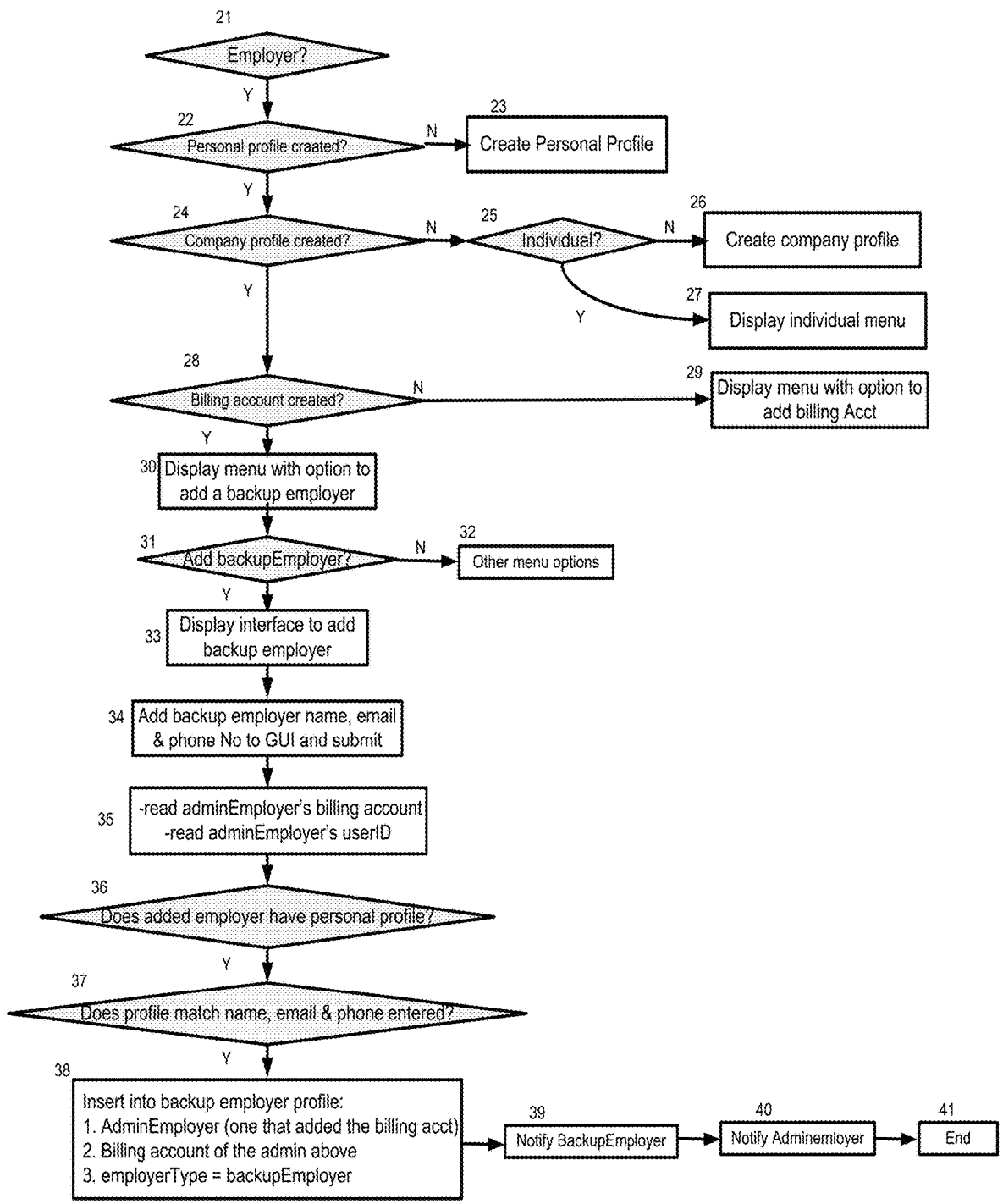
FIG. 15b represents the employer portion of the algorithm that displays user menus. It also adds backup employers to the system.

FIG. 15B represents the employer portion of an algorithm that displays employer menu or user menus and adds backup employers (users) to an employer billing account. The algorithm tests an authenticated employer 21 for creation of a personal profile 22. If not created, user is advised to create a profile 23. Next the algorithm tests for creation of the company profile 24 if not created, it tests for individual account 25. If account is not individual, user creates a company profile 26. Else the algorithm displays individual menu for an individual account 27. If the company profile is created, the algorithm tests for creation of a billing account or association with a billing account 28. If the authenticated user has no billing account, a menu with option to add a billing account is displayed for them instead of the final menu 29. If the billing account exists, the algorithm displays a menu with an option to add backup employers. They add the users utilizing a graphical user interface from a mobile phone app or website. That means that the authenticated user possess administrative rights to add and delete backup users from that company. They can view these backup employers graphically from the main menu company profile option or anywhere else.

To add users, the system submits email, phone number and name of a backup employer to be verified prior to recording the attributes of admin employer id, billing account number and employer type in the employer entity. Recordation of these attributes provides means for backup employers to use the billing account and hire workers or schedule them. A backup employer applies for an account using an interface where they type their name, email, phone number and company id requesting to be added to the system to establish a personal profile. This profile however is not complete until it is linked to the company profile of the admin user in the company. The algorithm authenticates at least one employer with administrative rights to add and delete backup users from that company account and view them graphically; and the additional users are added via a graphical user interface (GUI) to process the hiring and payment of short term workers. The GUI used to add backup employers provides text fields for name, email and phone number to submit to a database on a server. They submit email and phone number of backup employers to be verified prior to recording the admin employer id, billing account number and employer type in the employer entity wherein recordation of attributes provide means for backup employers to use the billing account.

If the user has a billing account opened by them 28, a menu is displayed for them showing an option to add a backup employer 30. If they don't want to add a backup employer 31, they use the other menu options 32 else a button link on the employer main menu displays an alternate user interface that adds a backup employers 33 when it lists name, email and phone number attributes of the users that request to be added to the company billing account as backup users, staff or sales agents. The employer user that possess administrative rights confirms the listed partial profile. The admin employer adds a backup employer name, phone number and email then submits for verification 34. With the alternate user interface, the admin employer confirms the listed backup users (employers) by hitting of a button besides a name(s) that is/are pulled from a database and displayed on the graphical user interface showing, email and phone number attributes. The submission tests existence of the personal profile (FIG. 15B: 36) and whether it matches (FIG. 15B: 37) then completes the requested partial profile and gives it a user type of backup employer, staff or sales agent. In the process, the algorithm reads the admin employer's account and user id 35 and submits them along the backup user attributes to complete the backup user profile and records into the database along with id of the admin user that confirms the backup user.

if the added backup employer has no personal profile 36, the user is informed that the person has no account else the algorithm tests the attributes submitted to see if they match the profile 37. Once the backup employer's profile match with the submitted attributes, three attributes namely admin employer id (one that added the account to this user), billing account number and employer type which in this case is backup employer are inserted into the profile entity 38. The algorithm notifies the backup employer 39 and the admin employer that gave access to the billing account 40 by email or text then exits at 41.

After ensuring account setup, this algorithm which generates the Employer Menu in the system provides button links for facilitating posting of short term jobs, accepting of job applicants, rating workers and writing reviews on them, view and pay invoice, submit invoice adjustment, add backup users to the employer account, change company profile and manage hours worked. The employer menu provides a method of tracking hours worked to determine worker's wages wherein button links that process start time and end time of a job, displays additional menus with individualized buttons for processing and editing one worker at a time or several workers at once.

This algorithm is utilized to give access rights to resources in any of our applications. If the user is a sales agent 42, a sales menu 43 is displayed and if they are staff 44, a staff menu 45 is displayed.

Figure 16:
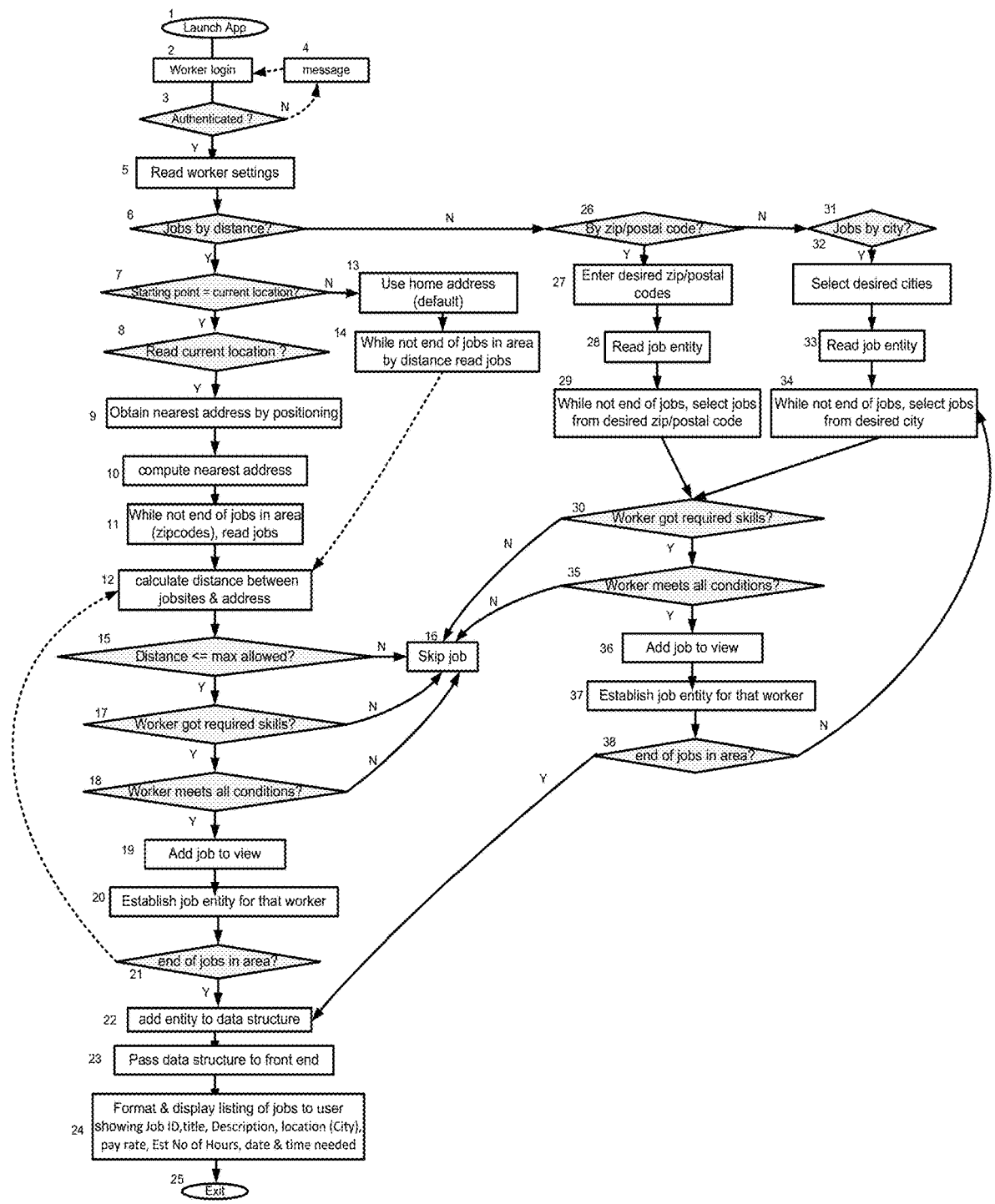
FIG. 16 is the algorithm that displays short term jobs.

FIG. 16 is an algorithm that displays short term jobs. From the system settings, a user chooses to start job searches from a home address or current location. They also set a default distance under which to look for jobs. The algorithm of FIG. 16 determines addresses of jobs or points of interest within a user selected distance. It enables a user to select jobs by either entering cities of choice or zip-postal codes in addition to the jobsite distance.

Launching of the App executes the algorithm 1. The algorithm authenticates a user 2-4 and reads the worker's system settings 5 for default values to determine if a criterion for job selection is by distance to job sites 6, then the algorithm reads a starting point which is either a current location or home address and utilize it to obtain distance to every posted job site in the database.

If the starting point is current location 7, the algorithm reads and utilizes the current location (x, y, z) 8 from at least three ground stations by positioning 9 or read it from a service station (provider server/tower) to determine the nearest address. It computes the distance 10 to the short term job addresses posted to a database.

While not end of jobs in the area 11, the algorithm reads the jobs and calculates distances between the address and job site address 12.

If the starting point was a home address 13 instead of a current location, it calculates distances from the home address to the job sites 14.

It compares the distance between the address and the job site address. If the distance is greater that the desired radius, the job site is not added to the list 16 else if a distance is within the selected default radius 15, triggers the algorithm to check if the authenticated worker has the required skills 17 and meets all other conditions 18 the job is added to the view or runtime entity or data structure 19. A job entity is established for that worker 20 by looping through the database until all jobs within that distance of the default radius are read into the data structure. While not end of jobs in the area 21, the view or runtime entity is added to a data structure 22. The data structure is then passed to the front end 23 for displaying. The short term job data from the server is formatted and displayed as a listing of short term jobs to authenticated users in a tabular format on a mobile phone, tablet or computer showing job ID, title, description, location (city), pay rate, estimated number of hours and date and time needed 24.

If the worker does not desire to utilize radius and set zip code instead in the settings 26, they enter the zip-postal code of choice 27 and reads the job entity 28. While not end of jobs in the selected zip code and default radius 29, the worker is checked for skills 30.

If at step 26, the user wanted jobs by city 31, they enter one city at a time 32 and read the job entity 33. While not end of jobs in the desired city 34, the worker is checked for skills 30. If the worker meets all other conditions 35, the job is added to the view or runtime entity 36 and establishes a job entity for that worker 37. If it is the end of jobs in the area 38, the entity is added to a data structure 22, passed to the front end 23 and displayed as a job listing in a tabular form 24 showing job id, title, description, location (city), pay rate, estimated number of hours, date and time needed and previous worker status for current employer. That is, if a worker has ever worked for employer. The algorithm exists at 25. Jobs can alternatively be added to a data structure without placing them in a view first.

The system facilitates software production by providing modules to various data driven web browser based Applications with a database or file system as the source of data.

The button links are populated by data structures at runtime to display short term job listings and pay rates posted by hiring clients or customers.

At any time, distance, zip-postal code and city can be entered directly into the application without going through the settings. The fields for entering zip-postal code and city are provided on the GUI. That provides what is referred to as a onetime filter.

If the user (worker) is accepted to a job and selects that job, they get an option to navigate to the job site. The algorithm executes the navigation module which guides the user's device to the address.

Figure 17:
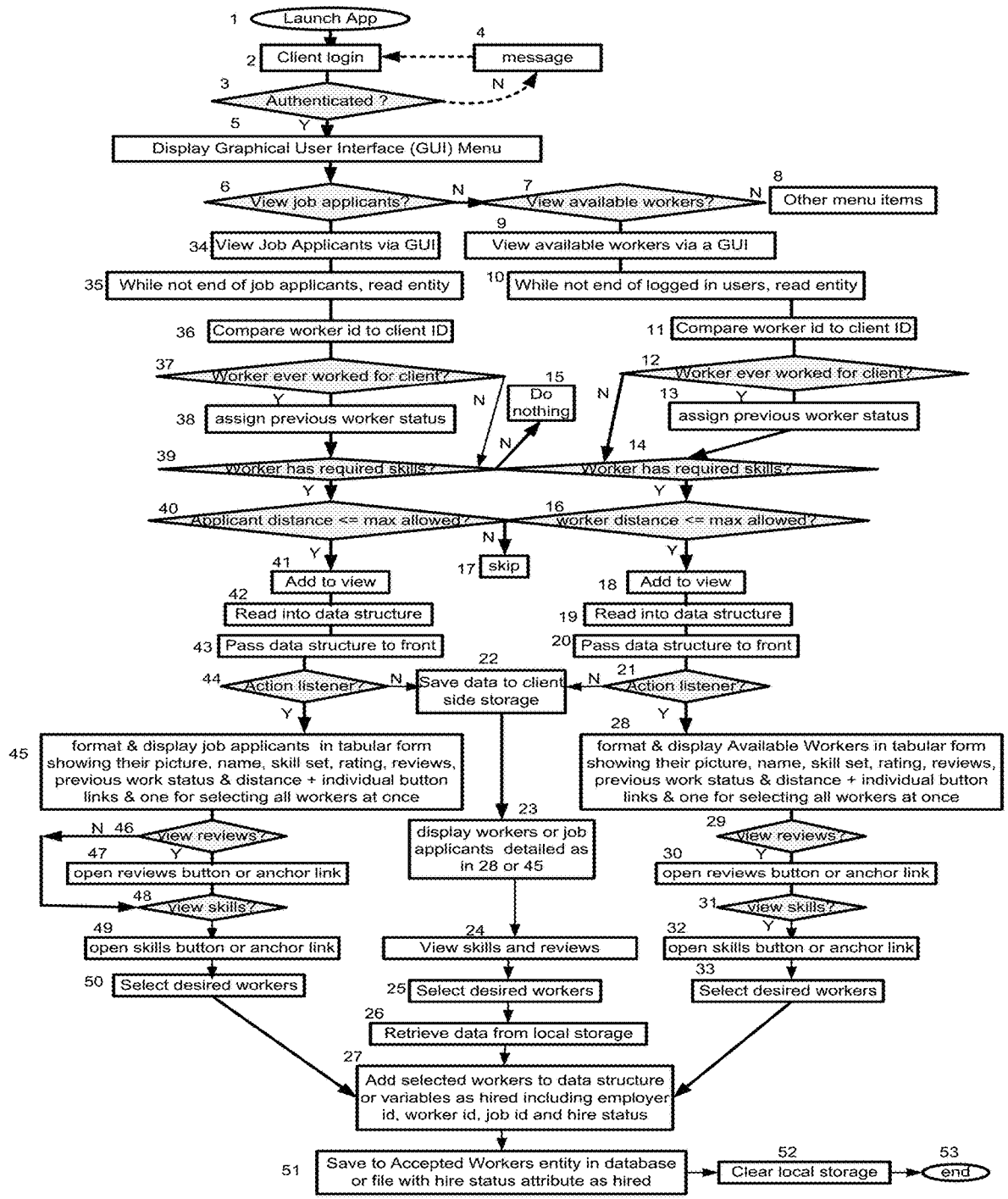
FIG. 17 is the algorithm that displays job applicants and logged in workers that are available to an authenticated employer (client) for hiring.

FIG. 17 is the algorithm that displays job applicants and logged in workers that are available to an authenticated employer (client). Steps 1-4 authenticates an employer and displays an employer graphical user interface (GUI) menu with tasks that include a button link for accepting job applicants FIG. 2A 5. The button link for accepting job applicants on the GUI provides the employer with an option to view job applicants 6 or view available workers logged in to work 7. The algorithm reads the entity containing available workers 9 or job applicants and iterates through all workers that qualify 10 while checking whether a worker has ever worked for the authenticated employer by comparing worker id to client id 11 and other qualifiers including rating and reviews 12. The worker is assigned previous worker status 13.

The algorithm further checks if the worker has required skills 14, the algorithm compares the worker's distance to the worksite 16. If distance is within set distance, the worker is added to the view or data structure for the particular job 18. If it is end of worker entity, the view or runtime entity is added to a data structure 19 and the data structure is passed to the front end 20. If action listeners are not engaged directly to the data structure 21, data is saved to a client side storage 22 which could be local storage, session storage or other then displayed as a listing of workers that have applied for a posted short term job in a tabular format showing pictures of the available workers, name button links, skill set links, graphical ratings, reviews links, previous work status for that worker, distances to the jobsite, a button link for selecting each worker individually and a button link for selecting all workers at once 23.

The applicants of short term jobs in the system are extracted from a database or file on the server into a data structure or variables, that is passed to a client side and displayed as a listing of available workers that the employer (client) hires. Data is extracted from the client side to return a hired status for each short term job applicant to the database or file on the server. The extracted data for the hired status includes employer id, job id and worker id for identification of users that are available for other short term jobs. Alternatively, action listeners are utilized instead of client side data storage.

If they choose to read the skills and reviews for a worker, they open the review button or anchor link 24. They select desired workers 25 and data is retrieved from local storage 26 to a data structure or variables 27 with the hire status flagged as hired. Data also includes the employer id that hired the worker, job id and worker id.

If at 21 action listeners were involved directly to data structures, worker data is formatted and displayed in a tabular form with details as before 28. If the employer choose to read the worker's reviews 29, they open the reviews displayed as buttons or anchor links 30 and if they choose to view skills 31, they open the skills button or anchor link 32 and select the desired workers 33 and add the selected workers as hired to a data structure or variables 27. Data includes employer id, worker id, job id and hire status=hired.

If at 6, the employer (client) wanted to view Job Applicants that have applied to a job they posted 34, they open a button link from the employer graphical user interface menu. While not end of job applicants in the job entity 35, read and compare worker id to client id and jobs worked on by worker 36. If worker has ever worked for that client 37, they are assigned previous worker status 38 and checks for required skills 39. If the worker also has the required skills, the algorithm tests for the distance to the jobsite 40 and add to the view or runtime entity 41. However, the distance may be tested at step 32 to eliminate long distances immediately.

At the end of the worker entity, the view or runtime entity is added to a data structure 42 and the data structure is passed to the front end 43 for processing. Data passed from the backend includes the following attributes from one or more entities workerId, skillsButton, distance from jobsite, rating, reviews, first Name (acceptWorkerButton), employerId, jobId, start Date, start Time, estimated hours, previous worker status and hire Status.

If action listeners are involved directly to the data from the backend 44, job applicant data is formatted and displayed with details as before 45. If the employer wants to read worker reviews 46, the reviews button or anchor link is opened 47 else if they want to view skills 48, the skills button or anchor link is opened 49. The employer selects the desired job applicants 50 and adds the selected applicants to the data structure or variables 27. The saved data includes employer id, worker id, short term job id and hired status.

The algorithm formats and displays a listing of workers that have applied for a posted short term job in a tabular format showing their picture, name button that expands to view details, skill set, ratings, previous job reviews, previous worker status and distance to the jobsite. It shows a button link for accepting each job applicant individually and one that accepts all of them at once. The skills, name button links and reviews are populated from the data source at runtime. Data of the selected workers is then transported to the server into the accepted workers entity 51.

When the employer hits the accept worker button, it connects to the data structure and inserts the hired status in that particular workers record changing it from the default of notYet to hired. For system efficiency, the Accepted Workers entity may be combined with the WorksOn entity. Worker selection is followed by accepting the workers at the job site for recordation of start time and submission of the hours which is accomplished by the algorithm of FIG. 18.

Figure 18:
FIG. 18 is the algorithm that accept workers at a job site and tracks hours.
Figure 18:
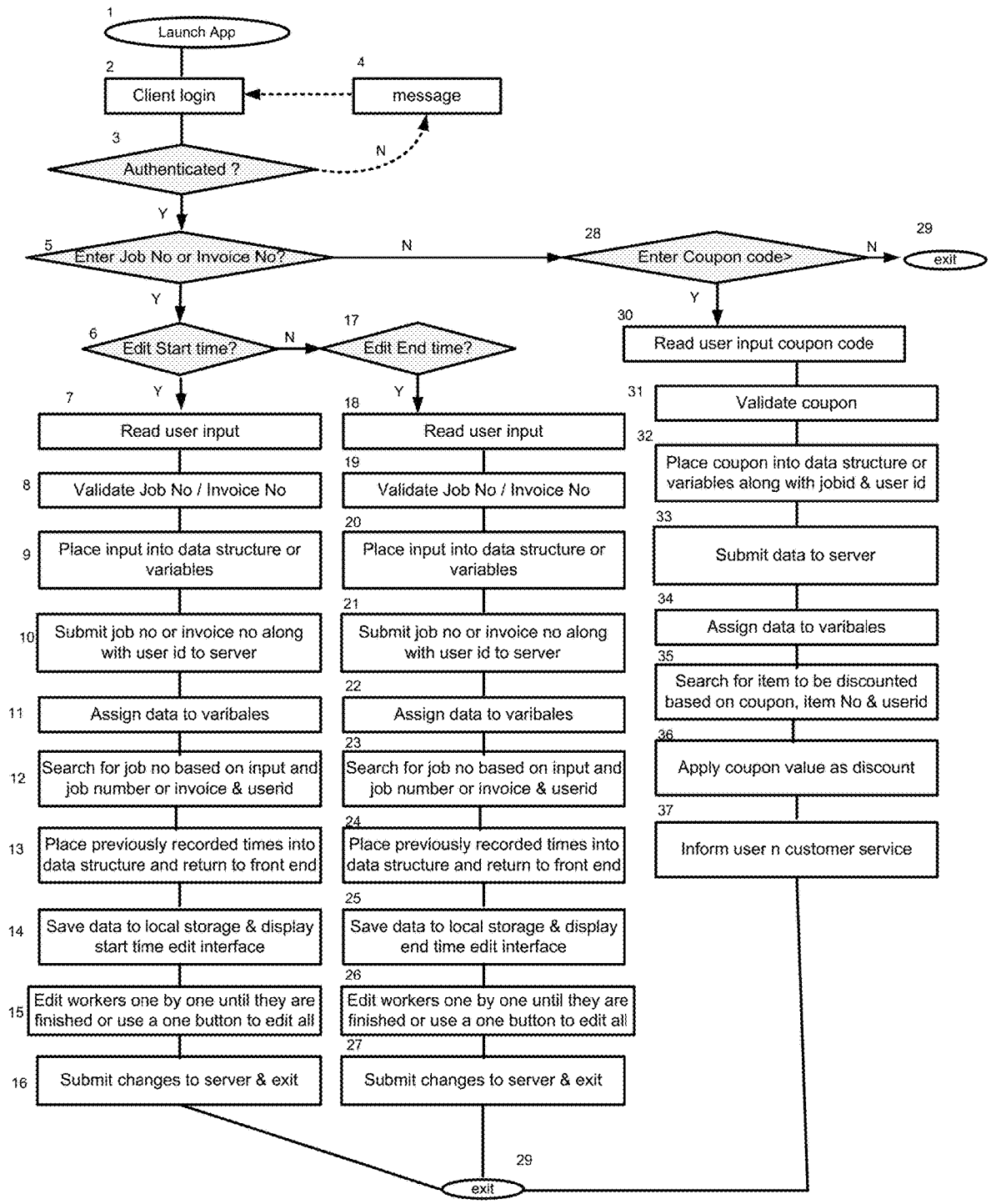

FIG. 18 is the algorithm that accept workers at a job site. The algorithm of FIG. 18 accepts workers at a job site, tracks hours and payments. Steps 1-4 authenticates a client (employer) to a departmental user menu (graphical user interface) that displays on a mobile device or computer in a tabular format with button links which opens new interfaces that accomplishes an employer (client) menu task. Utilizing a button link on a graphical user interface, the employer at a job site opens a new interface that shows the worker's they selected for the job 5. The algorithm displays the selected workers and the scheduled start time along with button links for recording time. This displays a new graphical user interface showing a listing of selected workers with name buttons, scheduled start time, the start clock button for each worker, a start clock button for all workers to start at the same time, an edit clock button for each worker and an edit all workers start time button generated at runtime. Each row of button links corresponds to an individual worker record.

The employer utilizes the start clock button for each worker, the start time button for all workers, the edit clock button for each worker and the edit clock button for all workers to accept workers and record time. The employer utilizes the accept for all button to record end time for all workers in a group at once or utilizes the ok (end time) button to record time for a worker individually based on the listed time and the edit end time button makes changes to the listed end time and the algorithm computes hours worked which are saved to a database in a server memory.

The algorithm in this system is utilized in determining hours worked in the short term worker's Apps, the scheduler Apps and Time Fix App by converting input time to a 24 hour clock and hours to minutes for comparison when determining hours worked by short term workers or scheduled workers. It assigns minutes worked to midnight minutes minus total start time minutes then adds total end time minutes wherein the method computes hours from one day to another.

If the time is correct 6, the client has two methods of accepting the workers onto the clock. One method is that of a single button that places all workers on the clock at the same time 7 where he/she presses the single button 8 or multiple buttons one corresponding to each worker 9. This allows the client to place workers on the clock one by one 10. If all workers that were selected from the job applicants or available workers are now accepted on the clock 11, nothing is done 13 until the end of day 12 when the client decides to sign off all workers at once 14 by using one button link 15 or sign workers off one by one 16 using a single button for each worker in case they leave at different times 17. The algorithm converts the input data to a 24 hour clock and compares time to determine hours worked. The algorithm for tracking time in this system is utilized in determining hours worked in the short term worker's Apps and the scheduler Apps. It converts input time 18 to a 24 hour clock and hours to minutes 19 for comparison when determining hours worked by short term workers or scheduled workers. If start time is greater than end time 20, the algorithm assigns minutes worked 21 to midnight minutes minus total start time minutes then adds total end time minutes. That is, minutes worked=(24 hours×60 minutes−total start time minutes)+total end time minutes. Minutes may be converted to seconds if necessary. In the algorithm, 24 hours×60 minutes is represented as 1440. This allows the system to compute time starting from one day and ending in the following day.

If start time is equal to end time 23 and both are in the AM or PM zone, the time worked is zero. If however start time is equal to end time but one of the time identifiers is in AM and the other in the PM, time worked 24 in minutes is equal to 12 hours×60 minutes which is converted back to hours before usage or display. If start time is less than end time 25, time worked in minutes 26 is Minutes Worked=total end time minutes−total start time minutes.

If all workers are not accounted for 22, the algorithm reverses to step 12 else if there are authorized time edits 27, the user interface for editing time is provided. If all workers are accounted for 18 and there is no need for editing the time sheet, the client submits the time sheet 28. The time sheet gets saved to the server.

The algorithm calculates net hours worked by subtracting start time from the time a job is completed 29. Here it puts into account the formulas of steps 18-26. It further subtracts lunch time if there was one and adds on travel time if paid travel is available. After that, the algorithm calculates the gross amount the client is supposed to pay 30 by multiplying the net hours worked by the hourly rate then by the number of employees.

To get company commission, the algorithm subtracts worker's percentage pay from the gross amount 31. It further calculates sales commission for the sales agent involved in bringing on the client company by multiplying company commission by sales agent percentage commission 32. It then calculates taxes for all involved 33 and generates invoice for the client 34. It finally generates paychecks 35 and exists 36.

FIG. 18B is the algorithm that adjusts time entries and process discount coupons. Steps 1 through 4 authenticates the user. They choose to enter a job number or invoice number 5 to process time edits which are divided into two. Start time 6 and end time 7. The algorithm validates the user input 8 and places the job no or invoice no entered into a data structure such as an array or variables 9. They submit entry along with session user id to server 10. Data is assigned to variables 11 which are utilized to extract the previously recorded time entries 12. The previous time entries are placed into a data structure 13 and returned to the front end. Data is saved to the client side and also displayed in a graphical user interface for start time edits 14. Workers are edited one by one or in a group using one button for all 15. Changes are submitted to the server and the algorithm exists or waits to call for editing on the end times. Steps 17 through 27 accomplishes similar tasks but for end time editing instead.

If at step 5, the user chose to enter coupon instead 28, the coupon is read 30 and validated 31. The coupon is placed in a data structure or variables along with id of item to be discounted 32 and user id and submitted to server 33. Data is assigned to variables 34 and utilized in the search for the item to be discounted 35. The discount value of the coupon is applied 36 and the user is informed along with customer service 37. The algorithm exits.

Figure 19:
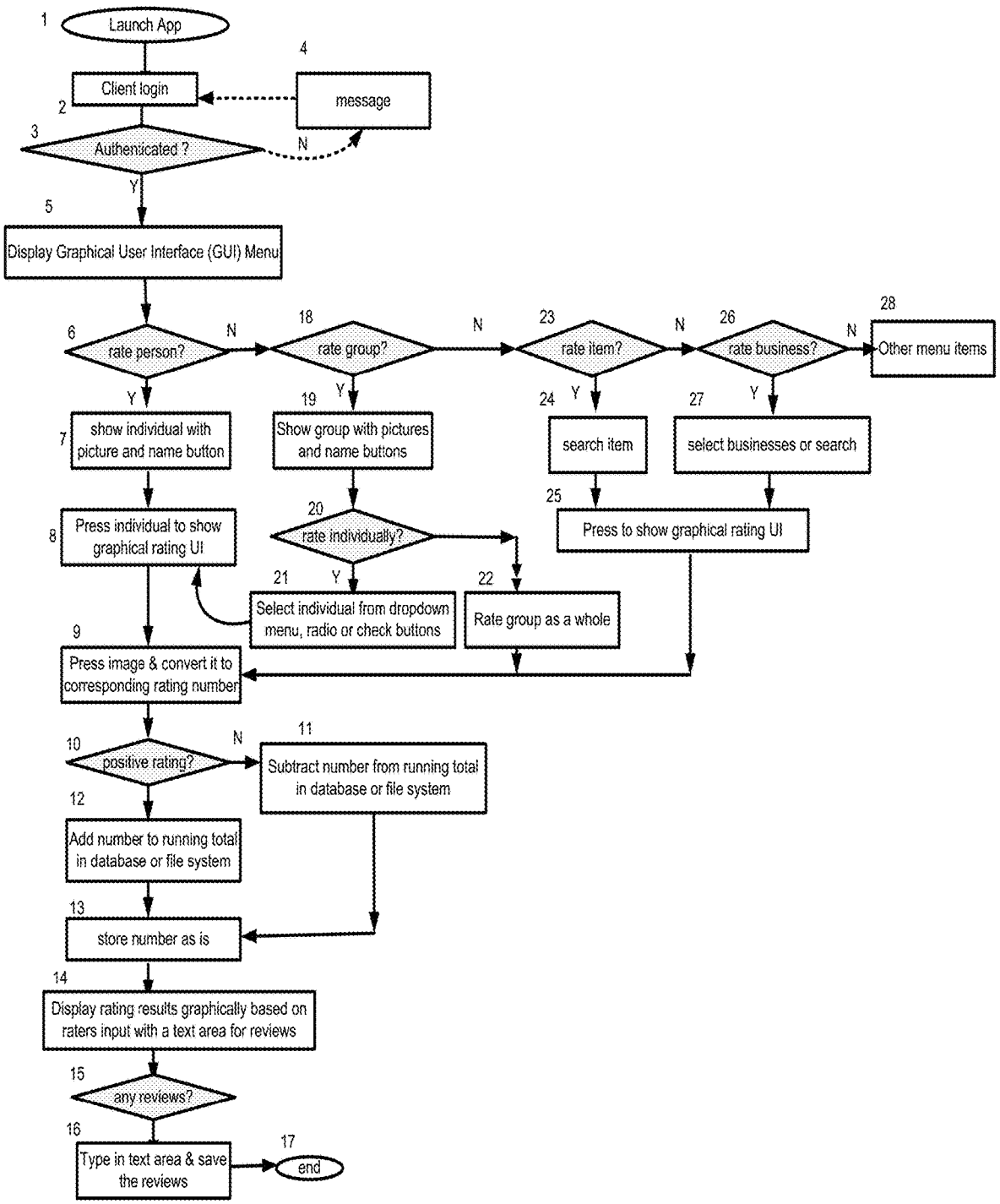
FIG. 19 represents the algorithm that rates workers, items and businesses.

FIG. 19 represents an algorithm that rates and reviews short term workers, items and businesses, utilize a rating mechanism that authenticates users.

Steps 1-4 authenticates a user and displays a graphical user interface 5 from which to rate and evaluate short term workers, items and businesses on a mobile phone, tablet or computer. A running total also referred to as accumulated points of ratings, is saved along with the ratings in the data source which is a database or file system. The running total which is a sum of the ratings, provides the final graphic rating output. A five star graphic display is equivalent to 100 points or 100 percent.

If the rater intends to rate a short term worker (person) 6, the rater (user) accomplishes this by selecting a worker of interest or a group of short term workers that worked on a project associated with the authenticated user. The worker 7 is displayed showing the worker's picture, name button link and other info. Hitting the worker picture or name button 8 displays a Graphical User Interface (GUI) 9 for rating a worker. Hitting a choice on the GUI gives a rating corresponding to that choice. If there are five graphics (stars) for example, hitting the third star gives a 3 and hitting the fifth star gives a 5.

The choice adds a positive number between one and five inclusive; that is, 1, 2, 3, 4, 5 or a negative number such as −2 to reduce the running total in the database on server for a very bad rating 10. The numbers 1, 2, 3, 4 and 5 can be any other number that adds up to a whole such as 1000 or 5000 instead 100. However, the running total of the rating comes to 100 percent no matter what numbers are used. The algorithm assigns that percentage number value to a graphical rating input and stores it numerically in a data source which is a database or file.

If the rating is not positive 11, a negative number value such as −2 is returned and subtracted from the running total. Both the running total and the rating are saved separately. Additionally, the project or job that was rated in case of a worker is linked to the rating for statistical analysis. Else if the rating is a positive number such as 1, 2, 3, 4 or 5, it is added to the running total in the database or file system 12. The positive number is also stored as is 13 in its attribute. Upon giving a rating, rating results are displayed graphically reflecting the number of graphic images the rater gave to a worker or what they rated 14. A text area is displayed on the graphical user interface for reviews or comments. If there are any reviews 15, the rater gives a review or comments in the text area and submits to save to the database in server memory 16. The algorithm exits 17.

If at step 6 the user encountered a group of workers instead of one worker 18, they would see a group of workers with pictures and name button links 19. If they want to rate individually 20, they select the individual worker of interest utilizing a drop down menu, radio buttons or check boxes 21 and return to step 8 for continuation. If however they want to rate a group as a whole 22 they hit the graphical image on the GUI and return to step 9 from where they give a rating corresponding to the choice of the graphical input image 9.

If at step 18, the user wanted to rate an item 23 instead of a group of workers, they would search for the item 24 from a search field and choose it to show a graphical rating user interface 25, which takes them to the rating interface 9. If the items are not very many, they are represented with a dropdown menu in addition to the search field. This applies to businesses as well.

If at step 23, the user wanted to rate a business instead of an item 26, they would select or search for the business 27 and press it 25 to show a graphical rating which leads to step 9 in the algorithm.

The running total cannot be increased when it gets to 100, that is when numbers 1 through 5 are utilized to represent one to five graphical images during the rating. The algorithm for rating and reviewing short term workers, groups of short term workers, items and businesses utilizing a numerical method that assigns a percentage number value to a graphical rating input and stores it numerically in a database or file, provides options for selecting workers, items or businesses that are rated individually utilizing a drop down menu, radio buttons or check boxes; and a rating button link that gives a negative rating to subtract points from accumulated points in the database or files in server memory. The rating method is characterized by this algorithm to display ratings. A text area for entering reviews or comments about what is being rated, a search field for looking up items, individuals or businesses to rate; and it extracts a numerical value from a data storage source and converts it to dynamically generated graphics equivalent to the assigned percentages for display to a user. The reviews are extracted and embedded into the application when displaying available workers FIG. 6 and FIG. 27: 14 and shows as links. A user opens a link to view the review text in a new window.

Figure 20:
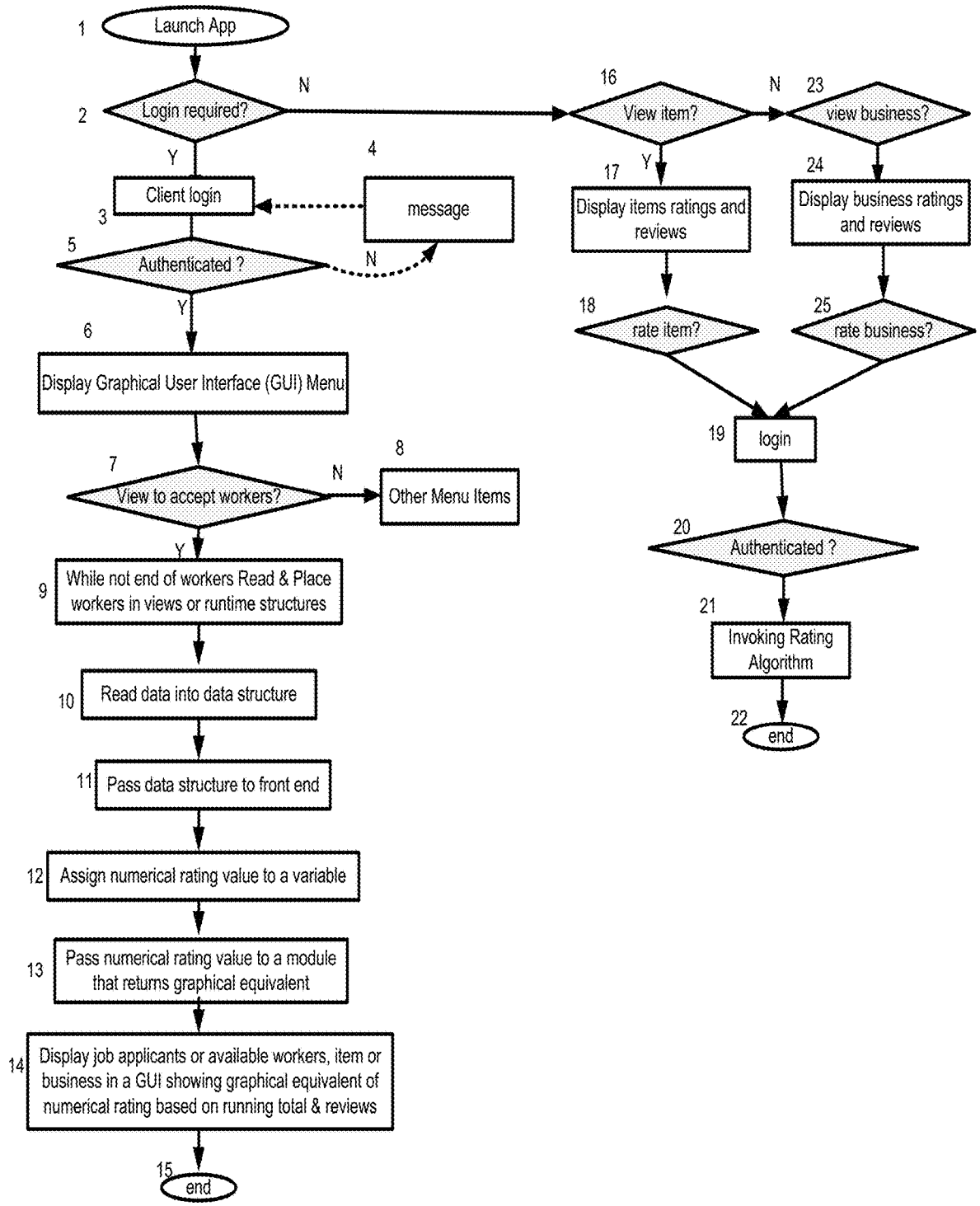
FIG. 20 represents an algorithm that displays ratings to a user seeking final rating and review results.

FIG. 20 represents an algorithm that displays ratings to a user seeking final rating and review results.

When a user launches the application 1, login requirement is determined by what type of ratings they want to view. If they want to view ratings and reviews of workers 2, then login is required 3. If not authenticated 4, a message is provided and login is presented again. The algorithm authenticates a user on a mobile phone, tablet or computer which in turn interacts with a database in a server memory and iterates through the worker records placing them into a data structure(s). It displays 5, a Graphical User Interface (GUI) where a user selects a menu option 6. If the user does not want to view ratings and reviews 7, they choose other menu options 8 else they choose Accept Workers button to view ratings and reviews 9. While not end of workers, records are placed into a view or runtime entity. If end of worker records, records in the view are placed in a data structure 10 and passed to the front end 11 for display. A user of type worker utilizes a separate GUI to view their ratings and reviews.

From the data structure, the numerical value of each rating is extracted and assigned to a variable 12. The rating in a variable is passed to a module that utilize percentage ranges to assign equivalent graphical images to the ratings 13. If five images are utilized in total, each image is assigned 20 points from the variable. That is, if the variable contains a numerical rating of 59, the module returns 2 graphic images to be displayed. If the variable contains a numerical value of 60, the module returns 3 graphical images. The module converts the numerical ratings to equivalent percentage representations of the graphical images. Though the displaying images are generated in real time, actual static images are utilized in some cases.

Alternatively, the module takes in the entire data structure and returns the number of graphical images to display. The images are drawn in real time but static images may also be utilized in the display.

The algorithm then displays the job applicants or available workers, item or business showing graphical ratings, reviews and other related information 14. The algorithm exists at 15.

If at step 2 the user wanted to view ratings or reviews of an item and not a worker 16, item ratings and reviews are displayed 17. No login is necessary. If however, the user also want to rate the item 18, they have to login 19. If authenticated 20, the user rates or reviews the item 21 and exists 22.

If at step 16, the user wanted to view ratings or reviews of a business 23, business ratings and reviews are displayed 24. If the user decides to rate or review the business 25, they login 19 and proceed through step 22.

Figure 21:
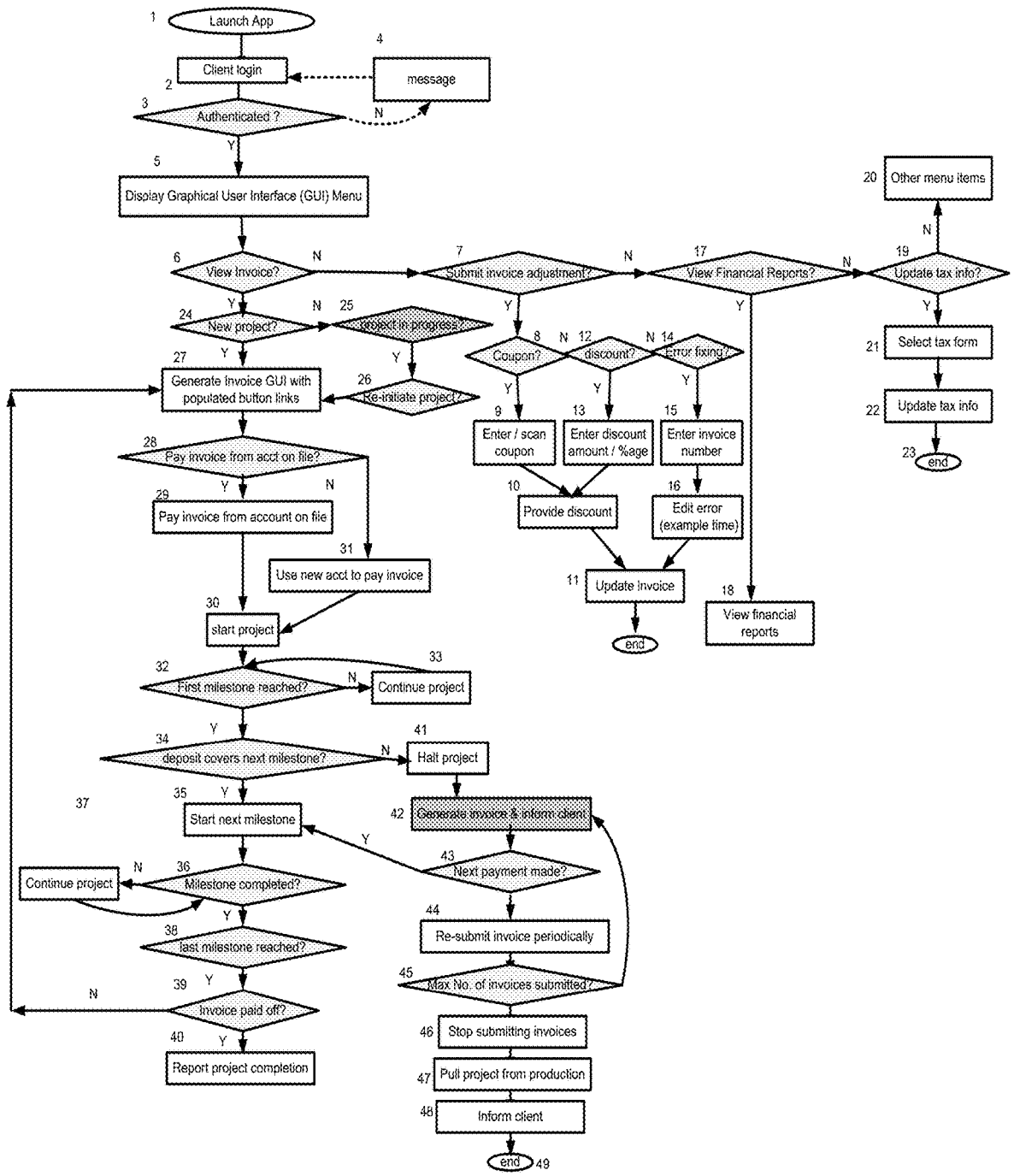
FIG. 21 is an algorithm that processes invoices, invoice adjustments, financial reports and tax documents based on individual person or company record.

FIG. 21 is the algorithm that processes invoices, invoice adjustments, financial reports and tax documents based on individual person or company record. Steps 1-4 authenticate a user to display the Graphical User Interface (GUI) 5 with menu options to view and pay invoice 6 or submit invoice adjustment. If the invoice adjustment 7 is a coupon 8, the user enters or scans the coupon 9, discount is provided at 10 and the algorithm updates the invoice 11 then exists. If the invoice adjustment is a monetary amount 12, discount amount is entered 13. It could be a plain amount or percentage.

If the invoice adjustment is fixing of an error such as hours worked 14, the invoice number 15 is entered from a selection menu or by typing in a text field and submitted along with the session id. The user gets an option for editing start time or end time 16. To insert invoices in the selection menu, invoices that belong to the client are read from a database or file and saved to the client device then retrieved for use.

To edit time, the user only edits actual start time and end time after the job starts. The invoice number and session user id are submitted to the backend and compared to the stored data which includes invoice number, job number and employer or user id, recorded start time and recorded end time. Hitting the Edit Start Time button link opens the GUI for editing start time and hitting the Edit End Time button link opens an option for editing end time. In that case, the invoice entered in the invoice text field is temporarily stored in a variable or data structure before compared to invoices in the backend data. It pulls the corresponding job number or job ID and the time sheet for that particular job number. Any edits are directed to that particular job number in the works on entity. The user does not have permission to edit scheduled start or end time after the job starts.

If the option from the GUI is viewing financial reports 17, the financial reports menu 18 is displayed. In these related menus, if the choice is not updating tax documents 19, the user selects other options 20. If the choice is to update tax information 21, tax forms are listed to select from and user updates a tax form 22 then exits 23.

If at 6, user selects viewing of invoice algorithm checks if it is a new project 24 and generates an invoice 27 or it is a project in progress but halted for payment 25 to be re-initiated 26. A graphical user interface is displayed generating an invoice 27 populated at runtime with data buttons and other data source data. The algorithm provides an option to pay the invoice from an account on file 28 where the account 29 displays and the invoice 30 is paid. Alternatively, payments are made from a new payment method such as debit/credit cards 31 by pressing a button link.

Data driven button links are dynamically generated and displayed along other textual record data at runtime. This is in reference to invoice details in a data source which is a database or file. The buttons links to particular customer records or payment accounts from where payments are made.

The installment or partial payments break projects into milestones that are marched to the partial payments. They are periodically payable through the system. Each partial payment made determines the state of the next project milestone continuation. The payments alert project consulting managers to proceed or to halt the project.

In case payment is for a project that has payment installments, the algorithm checks to see if the first milestone 32 is reached. If not, it continues progress 33. When the first milestone is reached, the algorithm checks to see if the payment covers the next milestone 34, if yes, the first milestone is started 35. Now the algorithm checks to see if the next milestone 36 is completed. If not, it continue monitoring progress of the project 37. When the last milestone is reached 38, the algorithm checks to see if the invoice is paid off 39 and reports project completion 40; else it generates an invoice for the customer 27.

If at 34 the deposit does not cover the next milestone, the project is halted 41 and an invoice is generated and the client informed 42. If the payment is made 43, the next milestone 35 is checked and the last milestone 38 is checked and the invoice pay off 39 is checked.

If on the other hand the next payment 43 is not made, the invoice is periodically re-submitted to the client 44 until the allowed number of times 45. The algorithm stops submitting the invoice to the client 46, and pulls the project from production 47 and informs the client 48. It exits 49.

Data driven button links are dynamically generated and displayed along other textual record data at runtime. This is in reference to invoice details in a data source which is a database or file. The buttons links to particular customer records or payment accounts from where payments are made.

Figure 22:
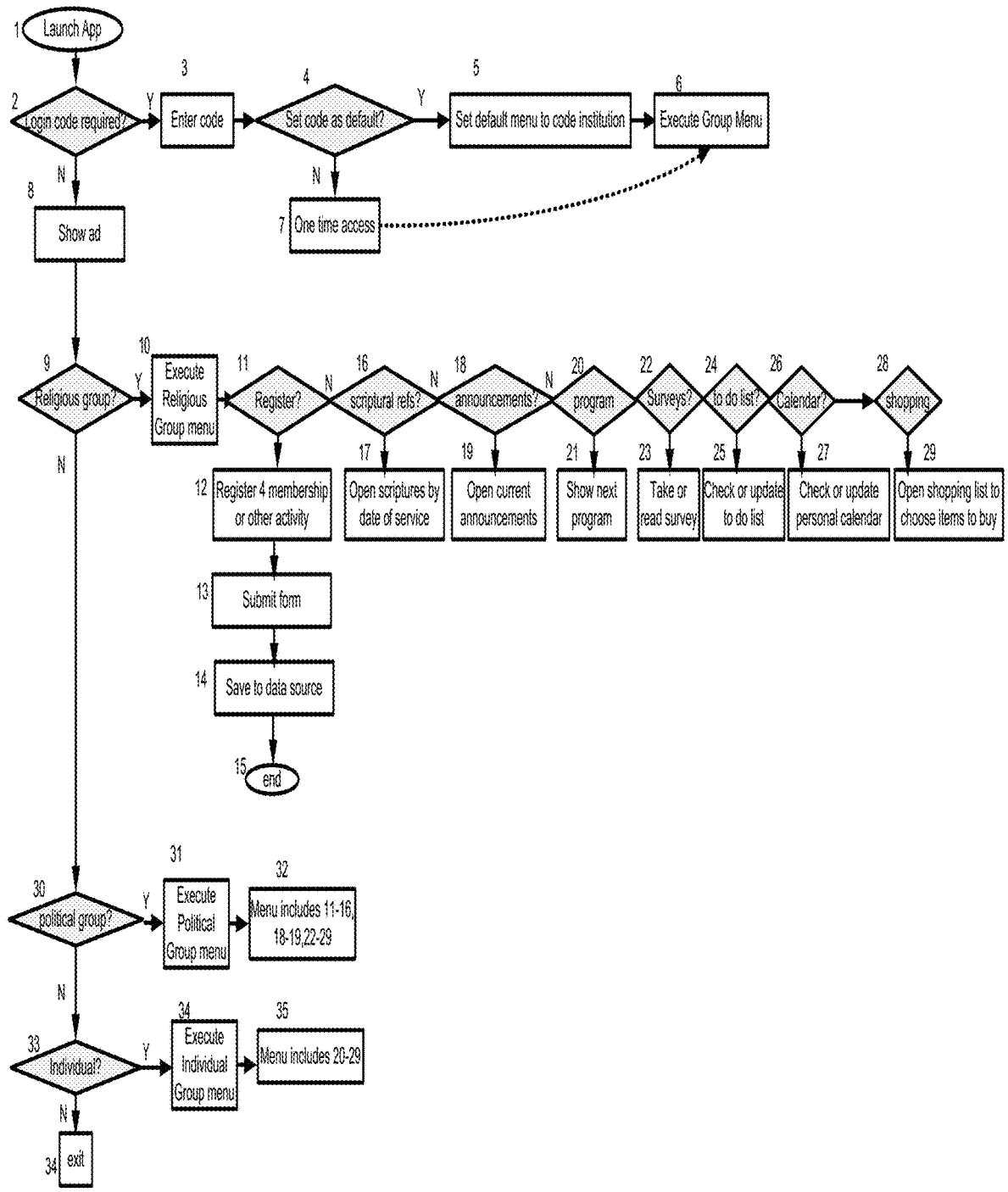
FIG. 22 is the algorithm that runs the App for a Religious Group, a Political Group and other forums. Some features of the App are also utilized by individuals.

FIG. 22 is the algorithm that runs the App for a Religious Group and a Political Group. Some features of the App are also utilized by individuals.

When a user downloads and launch the app for the first time 1, they authentication test 2 is conducted and the user enters the code they received 3. If they want to set the group menu as the default 4, they do so in step 5 and execute the group menu 6. Else they don't set the group menu as the default, they use the Group Menu as a onetime 7. The next time they are prompted to set a default menu.

After setting the default menu, the authentication test 2 does not require entering a code. It starts by displaying an ad 8 on the screen briefly and a group test 9 is conducted. If user belongs to a religious group, a religious menu 10 is displayed.

The communication module not shown, provides a mechanism for requesting rides to religious organizations and this displays available drivers and scheduled requests from riders at any given time wherein riders post requests and drivers view and respond to the requests. An administrator monitors un-answered requests and provide alternatives. The administrator adds and removes drivers. A driver also enters a code from the administrator and becomes part of the system. Anyone signs on as a passenger by creating an account with email and phone number. The religious menu provides options that include registration 11 that allows them to register for any activity 12 and submit a form 13 which saves to a data source 14. They exit at 15. If they choose the scriptural reference menu 16, it displays the scriptural reference 17. If they choose announcements 18, they open the current announcement screen 19. If they choose institution program 20, the current program 21 is displayed. If they choose to take a survey 22, the survey screen 23 shows up to take or read surveys. If they choose a personal to do list 24, the list app is displayed 25 for the user to set or read their set activities. This includes appointments with clergy and other religious or political officials. The clergy includes leaders of all faiths such as Christian Pastors, Bishops, Reverends, Apostles, Muslim Imams, Hindus, Buddhists, Jewish Rabbi and all other faiths. If they choose to read or update calendar 26, the calendar option is opened to check or update the calendar 27. A user with access to someone else's calendar may update or read it. Members of a religious or political organization with access to a leader's calendar goes in through the App and request for a meeting after viewing the open slots. The calendar owner allows who views or requests to meet with them. They add massively or individually utilizing button links in the calendar. The calendar data resides on a server and is accessible via any other device with a browser.

The Mobile App in this system provides a shopping list displayed upon opening a button link 28. Users add all the items they would normally buy and have them stored on the server. When it is time for shopping, users only opens a button link and displays shopping categories which includes groceries, toiletries, health and beauty, household supplies, cleaning supplies and others 29. Another category is customizable. Images are provided to identify most of the items.

Upon opening a shopping category such as groceries, groceries that the user would normally buy are listed for them to choose from to generate a shopping list. Hints are provided for similar items.

The user touches the items they want to copy to the day's shopping list. Voice commands may also be utilized to select the items. Each item purchased from the shopping list is marked and recorded in the statistical tables based on user configuration in the settings. The user configures the system to tally purchase routine and graph usage of items with time utilizing data from the statistical tables. They track expenses on specific items by entering the price they pay or scanning the items.

The communication module in the system provides a mechanism for requesting rides to religious organizations and this displays available drivers and scheduled requests from riders at any given time. Riders post requests and drivers view and respond to the requests. All drivers view available drivers so that they can schedule at different times.

If at step 9, the user was not a religious user but a political user 30, the political user Group Menu 31 is displayed. From the religious user menu, the Political User Menu 32 inherits option 10 and 16 to 25.

If at step 30 the user was not a political user but a standalone user 33, the individual group menu 34 is executed. This menu 35 inherits options 20-29. A database system or file system is established to track user shopping and calendar activities. All the Mobile Apps in this system are accessible over the internet because data resides on the servers. It is up to the user whether to go through the Mobile App or a large screen device with a browser. The said modules in this system displays scriptural references, religious announcements, religious programs, surveys, registration forms, religious and forum postings, response to postings and to do lists among other events in the religious and forum Apps.

The religious, forum and political apps generated from this system provides a shopping list recorder displayed upon opening a shopping button link whereby the user adds all the items they would normally buy and have them stored on the server for periodic retrieval when creating a day shopping list wherein selecting create shopping list, lists all available items by category. At any given time, the user launches the app and generates a shopping list by touching buttons on the mobile app which displays all items the individual normally buys. They add to the day's shopping list and use it in the stores. They touch buttons for each items they purchase and the buttons change color to reflect the purchase. The items that are not bought yet displays on top.

Each item purchased from the shopping list of the system in claim 20 is marked and recorded in the statistical tables based on user configuration that places them in categories such as groceries, toiletries, health and beauty, household supplies, cleaning supplies and more. The app keeps track of the shopping dates and reminds the user of possible expiration dates of items.

FIG. 23 is a representation of a Religious and political App characterized by a tabular display with a screen cell utilized for displaying textual, video and audio ads. Specific modules are used to control input and output in the App.

The Religious App displays registration forms, scriptural references, announcements, institution programs, surveys and personal to do lists among other events. The Political App on the other hand displays registration forms, announcements (Ads), surveys, postings, response to postings, archives and to do lists among other events in the App.

The system allows customizations based on specific religious institution or political organization needs. Users utilize the settings menu to set prayer times each day they want. Reminders tell them when it is about prayer time.

Religious groups include members of churches, Synagogues, mosques, temples and other prayer houses. A link is created and posted for web masters to link the web based version to their religious or political websites.

A code to identify a religious institution or political group is provided. The institution gives the code out to their members to enter into the App after download. That code acts as a login to execute the user interface of a particular religious institution. However, each user has an identifier such as a phone number and email.

A button link is provided to enable changing from one entity or user group to another by entering a different code. This allows the App to be used for multiple purposes including religion, political and personal.

The code may identify a country, type of group (religious, political or person) and group registration id. The administrator of the group gets admin ID. Can add backup.

A system setting is provided from where users enter the code to select their church, Synagogue, mosque or other type of worshiping house. Similarly, users change political groups. Once the code is set as default, the App does not prompt the user to select their institution. To change from one user group to another, users go to settings or just use a button link to change the code that changes the user group. The App is also accessible as a web based application.

The user group admin requests for a member code which they provide to their members to activate the Mobile App or Web based version App. The code may be sent to the user's phone or email or handed in person.

Figure 24:
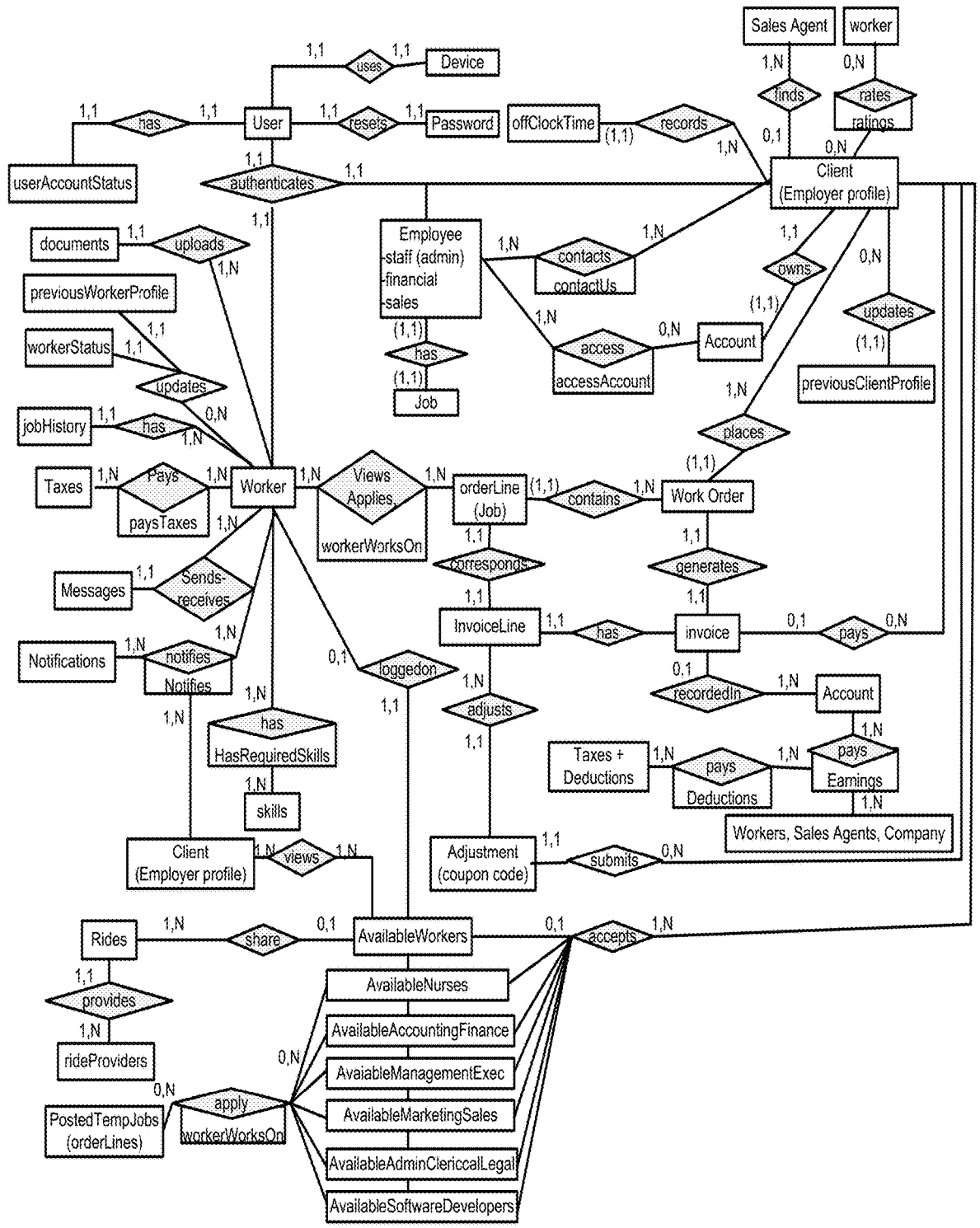
FIG. 24A depicts the entity relationship model from which a database schema is developed for the Short term Job Application and website system.
FIG. 24B comprises of Entity Relationship Models for portions of algorithms. They result into the database schemas of FIG. 25.
Figure 24:
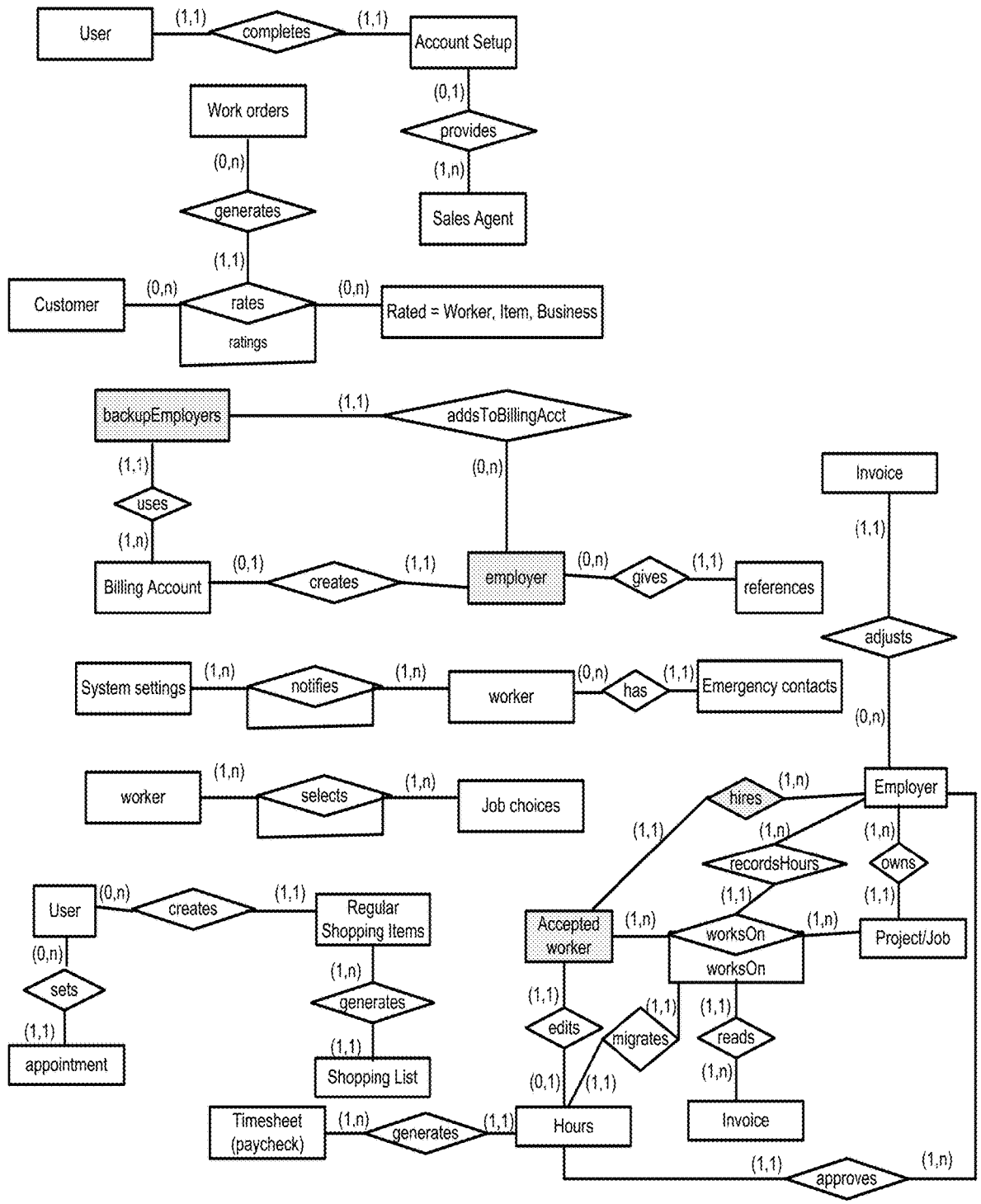

FIG. 24A depicts the entity relationship model from which a database schema is developed for the Short term Job Application and website system. It shows the main entities and their relationships which generates query statements for entering and retrieving data from the database. A file system or other non-relational databases can be utilized to replace the relational database management system when necessary. The main entities are as listed. User: Is the entity that stores the general user account information. It is also utilized to authenticate users. It relates to the Client Profile entity UserAccountStatus: Is the entity that tracks user registration completion. Whenever a registration step is completed, it is marked complete and incomplete otherwise. All registration steps must be complete prior to utilization of the services in full. These steps include but not limited to enter personal identifying info for initial account creation, upload pay stab or resume, enter legal working papers, upload photo, fill tax forms, setup payment methods desired and so forth. Each step is completed independently. A user creates an account to which they can log prior to completing the registration steps mentioned in the process above. This allows the user to come back each time and complete a few steps until they finish the registration process in the mobile app. The step by step temporary worker registration process is also referred to as partial registration process.

Client Profile: Records current information about the client also referred to as employer Previous Client Profile: Stores client's information that is changed but may be necessary at some point.

Employee (Worker) Profile: Records information about workers. For short term projects, this entity is divided into Admin, Developer, Staff and Account or Financial but it is the same entity. The various titles may be distinguished by type of employee attribute in the Employee entity. It maps to a graphical user interface to store new information and transfer the previous info to the Previous Employee Profile entity. However each of Admin, Developer, Accounts and Staff may be used independently.

Previous Employee Profile: Stores worker information that has changed. All records are tied to user id of either client or employee but their profile id (company code) is utilized along with the user ID to identify the records, the user and their corresponding company. The profile ID (company code) which is kept in the user entity is used to link to the client profile entity or employee profile entity.

Work Order: Customers place project or labor orders directly from the system application or website and comment on their orders. However, a customer can call in and customer service employees record an order over the phone. In such a case, the employees open an account for the customer. When a customer call about their order, a customer service employee can update the order for the customer. The employees working on the project order then view any comments and act accordingly.

Work Order Line: Order line refers to the individual order item within the work order.

An order from a customer may contain one or more order lines. In the entity OrderLine, an attribute named OLStatus has I for inactive by default. After a payment is made, the value of this attribute is changed to A for active. A program queries this value to display order lines that are active or inactive. Any flag can be utilized for this. After a certain period of time, all inactive order lines (where deposit was never paid), are deleted.

Adjustment: Is a discount to the customer submitted by the customer themselves or by the admin. It can be in form of a coupon or direct discount with actual figures. Sometimes is an error correction.

Invoice line: Is the service charge for an individual service to a customer. The service could be a project development or direct labor at a client's site. The entity stores the amount of money a customer owes for a project or labor. For project based service, Invoice Line Amount is equivalent to Quote Amount—Adjustment.

Invoice: Stores the amount of money a customer owes for all invoice lines. In other words, it is the sum of all invoice lines in a single invoice.

Account: Upon paying the invoice, the algorithm checks to see if the client's user id has an account associated with it. If no account is found, a new account is generated for the client and the invoice is recorded with initial payment. Otherwise the invoice is recorded in the account. This reflects account status as current. After an invoice is paid, the quote becomes a work order and it is activated by the paid status to become visible to the workers if it is direct labor and to developers if it is a project developers.

WorkerWorkesOn: It is the product of a many-to-many relationship between the Worker entity and the Order Line entity. It stores worker time tracking and other activity data related to the project being worked on.

ContactUs: This entity stores information entered by clients via the contact form. It also stores requests for account profiles submitted by backup users, staff and sales.

Password: Stores password rules to prevent users from resetting their password to the same password all the time. It also stores a user's id for reference to the user entity and other attributes that includes secret word for resetting a password on the fly and password hint which is a description of the password that reminds of a password.

Job: This entity stores information about jobs in relation to the workers.

Device: Stores information about user devices as indicated in the entity. These include device type, screen size, operating system, browser type and version, internet protocol address and other information.

OffClockTime: This entity stores time when the employer has no connectivity to the server. Time is then synchronized when a connection is established. It could be a mini database on the user device or memory in the device browser.

Earnings: This entity stores worker earnings.

Messages: This is where messages between users are kept. Workers communicate with employers they work for.

Documents: This entity stores worker documents. These includes paystubs, resumes, letters of recommendation, driver license copy, social security card copy and so on. The workers are prompted to upload the above documents. These documents are utilized in further identifying the workers.

Taxes: Stores work taxes and other deductions. Taxes includes federal, state, county and city taxes.

PaysTaxes: Is the entity that records tax activities for every worker for every pay period.

JobHistory: Stores worker job history.

HasRequiredSkills: Is a product of a many-to-many relationship between the Worker entity and the Skill entity. It stores skill information about each worker. It is referenced by the system application when looking for skilled short term workers.

Skills: Stores all skills referenced in the system.

RideShare: Stores information about shared rides initiated by workers without transportation. One worker initiates a ride share to save money and others join in.

RideProviders: The entity ride providers stores data pertaining to commercial ride providers such as uber, lyft etc. It also stores individual workers with cars that can be used to share rides with co-workers.

The worker menu in this system provides button links to facilitate shared rides with ride provider companies by electronically linking to the ride provider's software or accounts for fellow workers that provide rides to the same job site as the ride seeker. The ride button links to external ride provider software and provides a mechanism for requesting a ride through the short term job app. Workers initiate rides or join rides initiated by other ride seekers from here.

Ratings: This stores information specific to worker ratings. Companies or individuals that hire workers rate them so that others can see how good or bad they are. Star ratings are translated from and to percentages. It enables employers (clients) to see how workers perform before they hire them.

SalesAgent: Is the entity that stores information about workers whose job is to bring employer companies on board. They are in most cases paid by commission though some are in house.

AvailableWorkers: Availability activities of the blue-collar combination of jobs are recorded in this entity. The workers show up here when they are logged in as available workers and job listings are provided for that group by title. White collar short term workers are sorted from the entity by job title and corresponding skills.

Notification: This entity stores notification data such as notification type, notification status when logged in (on/off). Notification status when not logged in. When off, the worker is not notified.

Notify: This entity stores actual notification data relating to selected workers. It is referenced whenever workers are selected for posted jobs in a given area.

Nurses: This entity stores profile information specific to nurses and other medical workers. It is utilized instead of worker profile in the mobile App and Website specific to nurses and medical workers.

Other entities that are in the category of the Nurses entity each with its own mobile app represents professions as follows: Account Finance, Management Executive, Marketing Sales, Administrative Clerical Legal and Software Design & Development, Web Design, Graphic Design and Mobile Apps. Each have a corresponding mobile App and Website that work in conjunction with the job framework software to accomplish the provision of short term jobs in that field.

The nursing app provides job listings for all the different types of nursing distinguished by title. These includes but not limited to registered nurse (RN), licensed practical nurse (LPN) and certified nursing assistant (CNA). To record data about nursing activities, the entity Available-Workers in the E-R Model is replaced with the entity Available-Nurses. When a healthcare worker hits the menu option "View-Apply For Nursing Jobs" on the mobile app or website, they get a job listing of the different kinds of nurses as listed above. In one implementation, the listing is provided on one page showing differences by job title. In another implementation, the job listing is provided on separate pages displayed under different tabs. One tab is for RN, another for LPN, another one for CNA and so on for all the types of short term medical jobs. Workers select and apply for the jobs they are interested in. The web based application executed via a website provides functionalities of the mobile app. That is, provides listings of short term jobs that are viewed and applied to by short term workers.

Similarly, each mobile app and website developed for each of the different profession among the one's listed replaces the entity AvailableWorkers with its own entity to record data. That is, the mobile apps and website developed for short-term jobs in the Software & Graphic Design industry replaces the entity AvailableWorkers with AvailableDevelopers to provide a listing of jobs in that industry or profession. The mobile app and website developed for short-term jobs in the Accounting & Finance industry replaces the entity AvailableWorkers with AvailableAccountFinance entity to provide a listing of jobs in that industry or profession.

The mobile app and website developed for short-term jobs in the Management Executive industry replaces the entity AvailableWorkers with the ManagementExecutive entity to provide a listing of jobs in that industry or profession.

The mobile app and website developed for short-term jobs in the Marketing & Sales industry replaces the entity AvailableWorkers with AvailableMarketingSales entity to provide a listing of jobs in that industry or profession.

The mobile app and website developed for short-term jobs in the Administration, Clerical & Legal industry replaces the entity AvailableWorkers with AvailableAdminClericalLegal entity to provide a listing of jobs in that industry.

Each of the mobile apps work independently and in conjunction with its corresponding website from where employers enter data conveniently. Each of them provides job listings specific to the industry and the jobs are accessed by title. A website specific to each of these professions is created with a corresponding mobile app. Workers without mobile devices to download the app apply for the jobs and accomplish all the necessary steps from the website. Similarly, AvailableWorkers which is utilized for blue-collar jobs, is replaced with AvailableNurses for medical jobs.

When an employer responds to the job seeker and confirms they offered them a job, the job seeker' ID is released from all the other jobs they have applied for during that period and are informed of the reason why they can't apply for another job at that time. If there is a technical problem, they are advised to contact tech support.

If an employer accepts a worker but don't take the worker, a button is provided to the worker to inform the system. The system automatically applies to the maximum number of available jobs best suited for the worker and informs the worker to wait for employer response.

In the event an employer accepts (OrderLine) and employs a worker, the employer's manager in the field records start time and end time of the job which is primarily pulled from the system according to the work order unless when the manager manually changes the start and end times from a job site.

After the manager records the worker's time in the system or a few hours before the end time of the current assignment, the worker's ID is released to be able to apply for more jobs. At that point, available jobs can be sent to the workers ID depending on their system settings.

Workers that sign up to get text alerts or email alerts whenever a job is available are informed according to their selection. The workers sign up for text or email alerts from their personal home pages under the Alert or System Settings Section. Text and email messages links to job listings. When jobs are posted, alerts are sent to the workers and these alerts trigger device features such as sound alarms and vibrate.

Figure 25:
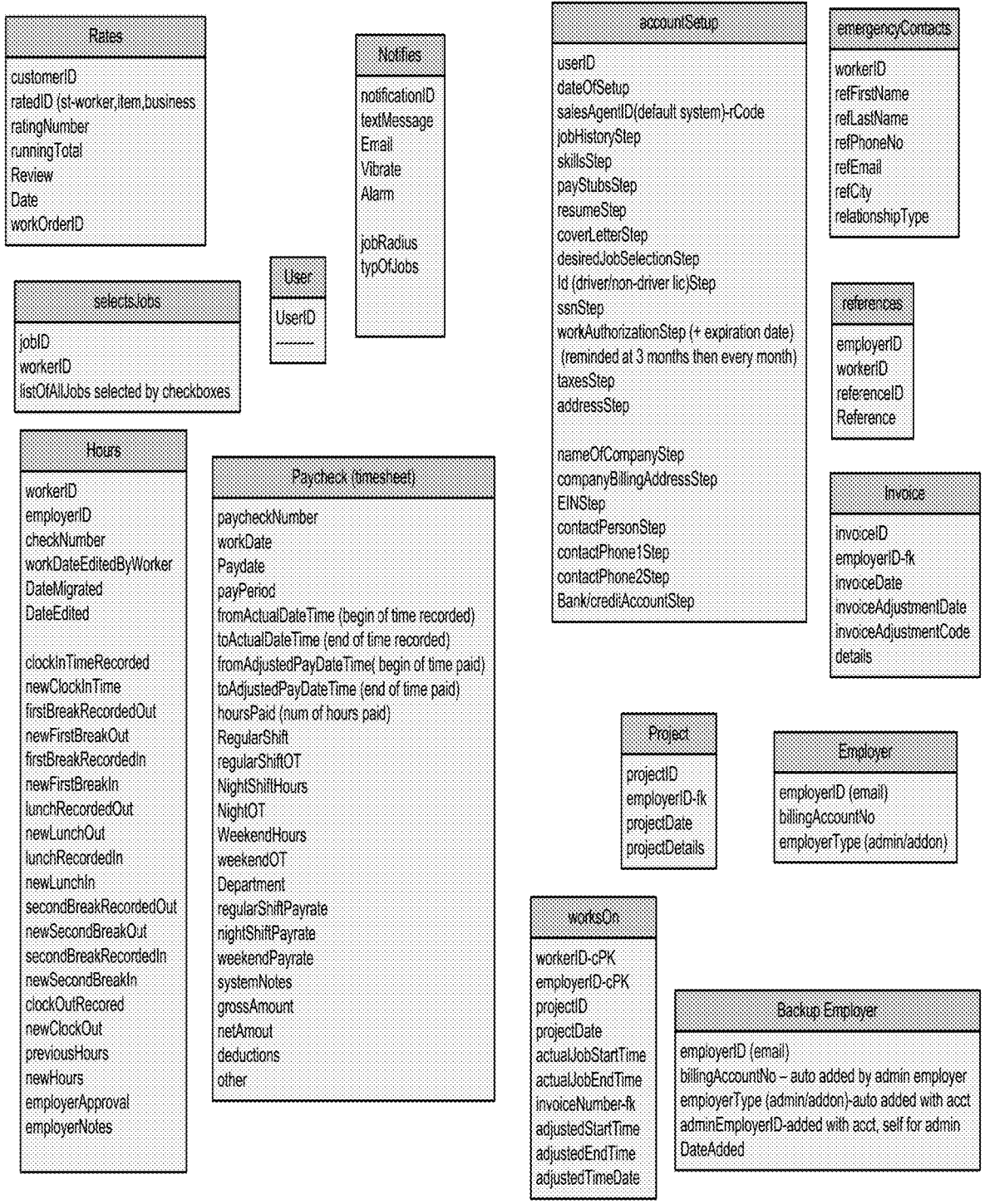
FIG. 25 makes up parts of database schemas that are utilized in various apps.

FIG. 24B comprises of Entity Relationship Models for portions of algorithms that result into database schemas including that of FIG. 25. Entities and their attributes are described by the relationships as showed in the diagram. Other entities not showed includes one for storing ads posted by the system in form of text, audio and video. These ads are customized to user groups and individuals. However, employers also sends out announcements in a similar manor. The employer account posts announcements in form of ads that are saved to the database on a server along with ads posted by the system administrators and the ads are displayed for the worker and employers in form of text, audio and video in a designated window of an interface as seen in FIGS. 2, 3, 30, 31 and 32 on a mobile phone or tablet further discussed in [213].

The Workers and Project entities generates the worksOn entity which stores the project id, worker id, employer id and invoice number relating to the employer's project. This entity is utilized to provide worker ids that populate data for FIGS. 12, 13 and 14. The data includes but not limited to job info, crew and emergency contacts. The data is retrieved from other entities based on the ids in the worksOn entity. The worksOn entity can be named anything else.

To enable recording and editing of the hours and time data or timesheet hours in general, the system utilizes the Project entity which represents projects or work shifts. At least two shifts are included in the time system. The system also uses the employer entity, the worker entity, the worksOn entity, the Hours entity and the paycheck (timesheet) entity with their attributes as listed in the database schema.

Workers work on a project or shift and their hours are saved in the entity worksOn. Timesheet hours are saved utilizing an employer mobile phone app time tracking module, a punch card, a computer entry or a worker mobile phone app. In the primary system, the employer utilizes their mobile app or browser based application to edit the start time, end time and utilizes coupons to change outcomes of a paycheck.

In a secondary system which is independent, data saved in the worksOn entity is migrated to another entity that may be referred to as Hours. The worker is given access to edit their own hours from the Hours entity. If required by the client company, the supervisor approves any edits made by the worker as seen in the entity relationship model. The Hours entity is then utilized to generate paychecks. A maximum and minimum number of hours are set in the system such that when a worker edits beyond the maximum allowed hours per day or week, the system triggers an alert to management to check out the data entry for errors.

Upon editing of hours, the system records employee ID, shift and date of editing.

A mobile app interfaces with the data in the Hours entity 5 to perform the edits. The worker also reads their hours to date from the mobile app. This system is separately known as the Timesheet. The timesheet launches its own mobile app which also displays announcements or ads in form of text, audio or video.

FIG. 25 makes up parts of database schemas that are utilized in various applications. The schemas show entities and some of their respective attributes as utilized in the system.

Figure 26:
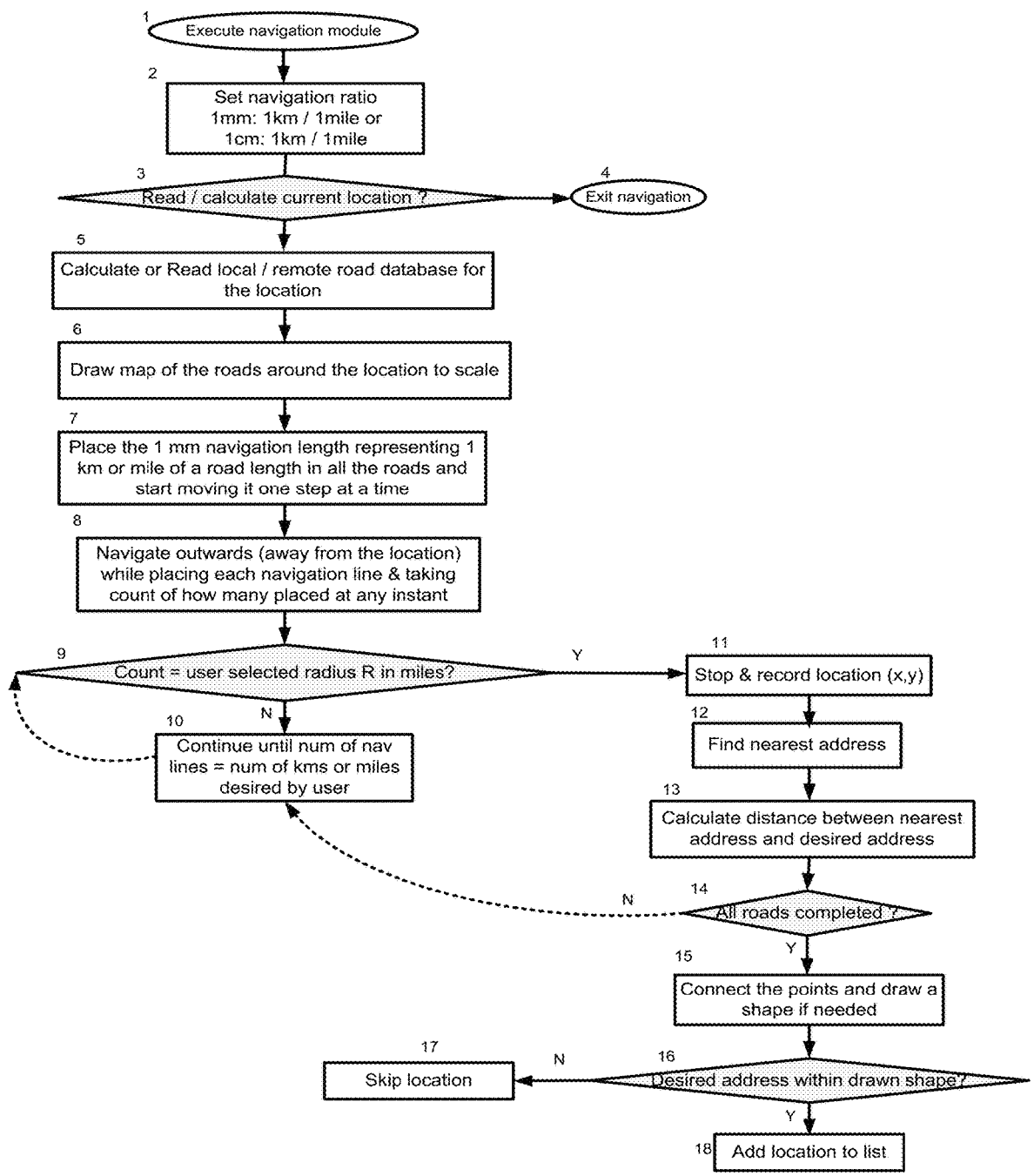
FIG. 26: The algorithm of FIG. 26 navigates representative roads to determine points at which a given distance (selected radius) ends hence determining which jobs to select for a short term worker.

FIG. 26: The algorithm of FIG. 26 navigates representative roads to determine points at which a given distance (selected radius) ends. Upon executing the algorithm 1 and selecting a desired radius, it reads the set scale for representing a long distance on a road such as kilometer (KM) or mile. The short representative distance could be 1 centimeter, 1 millimeter or shorter 2. The algorithm then reads or calculates the current location 3 or exit 4.

If at step 3, the algorithm is coded to read or calculate the current location, it calculates the current location or reads it from a database which could be local or remote 5. It utilizes data of the current location to draw a map of the area 6 showing the roads drawn to scale. It places the short nav distance in every road and starts navigating away from the point one step at a time 7. It navigates outwards while taking count of how many short nav distances at any given instance 8 for comparison to the number of miles or kilometers represented by the selected radius in 1.

The algorithm places the nave distances by looping through again and again. If count of the nav distances is not equals to the number of user selected radius R in miles 9, it continue looping until the number of nav distances equal the number of miles or km selected by the user as radius 10.

If count equals the number of user selected radius 11, the algorithm stops and records the location (x, y). It reads the nearest address to the location 12 and calculate distance between the nearest address and desired address 13.

If some roads are not completed 14, the algorithm returns to step 10 and continue looping while placing the nav distances. If all roads are completed at step 14, the algorithm connects the points and draw a shape if needed 15.

If the desired address is outside the shape 16, the site location is skipped 17 else it is added to the list 18. The algorithm then displays the list utilizing a data structure or straight data holder variables 19 not showed.

However, addresses are converted to longitudinal and latitudinal points from which distance between the two addresses is directly calculated.

Figure 27:
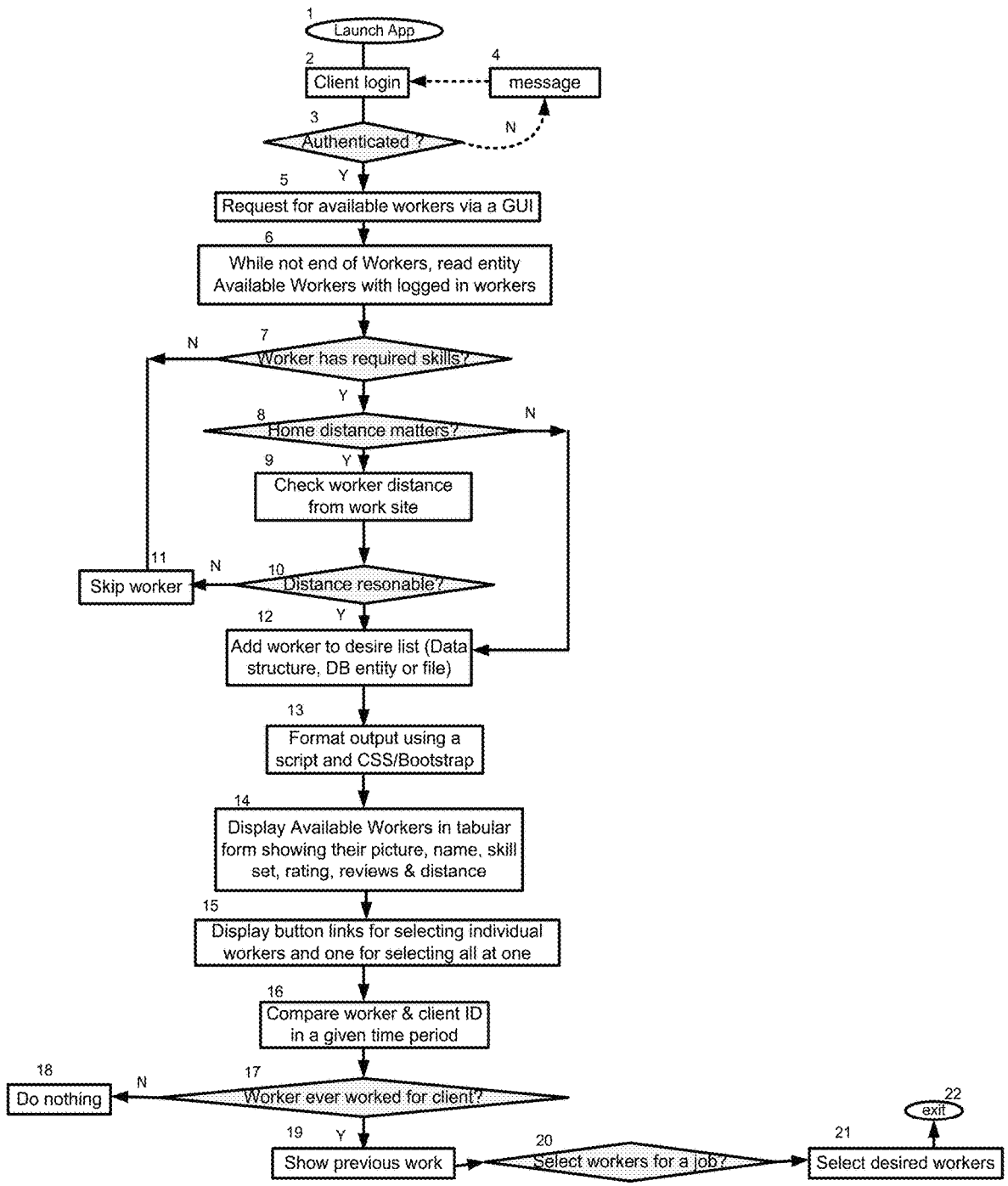
FIG. 27: The algorithm of FIG. 27 extracts logged in workers that are available in a database system and displays them to an authenticated client.

FIG. 27: The algorithm of FIG. 27 extracts logged in workers that are available in a database or file system and displays them to an authenticated client for hiring. Steps 1-4 authenticate the clients. The client checks for logged in workers by opening a button link on a graphical user interface 5. With this request, the algorithm reads the entity containing available workers that are flagged as available 6 and iterates through all of them looking for ones with required skills 7. Those with no skills 11 are skipped and the ones with skills are further tested for location or home distance from the job site 8-9. If distance is reasonable 10 or doesn't matter to the employer, the worker is added to the employer's list 12 which is a data structure, database entity or file. The list is prepared for output by formatting it using a scripting language such as JavaScript and CSS, bootstrap or other 13. The available workers are now displayed in a tabular form tailored to the client's needs 14. The display shows the worker's picture, their name, skill set, rating, reviews and possibly distance from the work site. The tabular display of workers provides a button link for selecting all the workers and other button links one besides each worker for individual selection 15.

The algorithm now compares the client id to the worker id in previous work orders over a specific period of time to see if the worker ever worked for that client 16. If a worker has never worked for the client 18, nothing is done. If however a worker has ever worked for the client 17, it is indicated besides the worker 19 so that the client can identify them easily. If the client decides to select worker(s) for a job 20, they utilize the button links on the graphical interface and select all the desired workers 21 and exit 22.

The next step following worker selection is accepting them at the job site for recordation and submission of hours to process paychecks.

FIG. 28 represents a graphical user interface for starting time at a work site. It records start time and generates a time sheet from the individual and group buttons showed. After entering job id which shows up automatically when there is only one job for the employer, the listing of workers displays with their start time based on the data saved in a database or file when creating the job order and selecting workers. The employer hits start clock for all workers to start them at the same time or utilize the individual buttons to start each worker individually. The button labeled "Start Clock for All Workers" records all workers involved as having started at the same time. The button labeled "Edit start time for all workers" allows the employer to change start time once for all workers. This invokes the algorithm that controls the graphical user interface to register time for all workers to the same time. "Start Clock" and "Edit Start Time" controls time for individual workers. The start time is alternatively entered manually as displayed on the figure. Similarly, the end time is manually entered from the corresponding end time figure.

FIG. 29 is an end of day time recording user interface at a work site. It facilitates time entry for each worker and a group of workers at the beginning and end of a work day or week. Individualized buttons on a graphical user interface records the time for individuals and group buttons records time for groups of workers.

Upon launching time sheet to start time at the beginning of the shift, the payment module in the application loads all the accepted workers and corresponding project information to the client's mobile device. This is saved in a mini database or browser memory. It is used primarily to save time entries on the device when there is no connectivity. After the client gets connected, they are prompted to upload the data and synchronize with the server version for each project. Start times and end times of each project are entered by the client upon setting up a work order. The graphical user interface provides buttons to confirm start time and end time so as to calculate the actual number of hours worked. It also provides the client with an option to manually enter total number of hours. Utilizing the number of hours worked, pay rates and deductions, wages are calculated for each paycheck and electronic payments are made. The buttons "Accept Time as is, all" records that all workers involved started at the same time. The "OK" buttons approves time for on worker and "Edit" edits time for one worker. The "Edit one to apply to all" button applies one change to all workers. Not shown is a graphical user interface with a button that synchronizes data saved on the employer's device and the database or file system on the server. The data saved includes but not limited to start time, end time and number of hours worked.

If a company uses its time system such as punch card or login, an option is provided for the employer to enter total hours by day and by week and by month. The start time and end time is not used in such a case. Date fields are provided for entering time range. Checkboxes not shown are provided against each name to enable the employer select names before submitting manually entered time data. The user interface is rendered vertically on small screens.

FIG. 30 represents the Mobile App that edits timesheets in work environments where workers are paid hourly.

FIG. 30 is the user interface utilized by workers to record and edit timesheet hours utilizing a mobile phone app or tablet so as to reflect the correct hours and wage payments. Regardless of whether time is entered via a mobile app or website or punch card reader, a button link on the worker menu transmits instructions to the processor to read the timesheet data from the database or files on a server and display it in a column besides Edit buttons on the time fix interface (4-12). At the end of a pay period, such as a day, week, two weeks or month, the system reads data from where it was entered and allows the worker to correct only their data by authentication. A logged in worker displays their data of the current pay period with options to edit the time. When they submit, time is saved to the data storage such as database or files in a server memory.

If data is originally entered by reading a card or punching keys in any device, this system reads it to a production environment where it is stored after modification. It identifies users by user id unless when the company involved wants names to be displayed. However, it shows in the local data storage with names.

The mobile phone app departmental user menu which is accessible by authentication, provides clock in time with a button for editing it, first break clock in, first break clock out, lunch break out, lunch break clock in, second break clock out, second break clock in, travel time and final clock out time all with their respective buttons for editing the time and more. The Edit buttons open interfaces from which to edit time data and a submit button transmits instructions to a processor to save the time data for short term workers to the database in server memory. The app provides a screen for displaying announcements and ads that can be in form of text, audio or video.

Options are provided for a supervisor or manager to approve or ignore and let save as entered. However, if hours exceed a certain pre-set number of hours, the system informs management prior to processing a check. The pre-set number is the maximum number of hours one can work a day or week. A user interface not shown, is provided to management to set the maximum number of hours an employee can work for a day or week. The minimum is zero by default. The purpose is to control data entry errors.

FIG. 31A represents a user interface utilized by a medical supervisor to schedule workers. It is comprised of a title 1 as seen, current date 2, at least one window for displaying ads or announcements 3 with an optional title and a group of button links 4 for processing tasks. The tasks includes but not limited to Scheduling employees, changing options for how the schedule is viewed by the employees which includes individual and group schedules, viewing group schedules, posting announcements, posting overtime available, adding or editing employees in the system, processing time off requests, downloading patient activity and more.

The supervisor can oversee more that one jobs and so they view job details from the first button link under step 5. Step 5 also provides button links for processing inventory of whatever is maintained, hours to date, a messing system, a calendar and a button link for processing time off requests. Though these are carried out from a mobile app, the same functionalities are provided on large screens via browsers.

FIG. 31B displays the schedule for the workers and supervisors. Depending on the settings, the schedule can display for one day, seven days as seen on top of the mobile app or longer. In case of a week, the user opens a day tab and views the schedule for that day. The schedule is also viewable on a bi-weekly basis, month basis, quarterly, semi-annually or annually. Supervisors set the schedule to be viewed as a group schedule or individual schedule.

The system exhibits a mechanism for dynamically displaying button links based on records read from a database or file system at runtime to data structures that are passed to the client side along with other data for manipulation and display in a tabular format. Schedules of workers are listed for a day, week, two weeks, month, quarterly, semi-annually or annually along with start times.

A settings button link 6 provides a user interface for configuring the schedule display and all other displays including the calendar on the button of step 5. The modules in this system are utilized to control input and output in Apps characterized by ad screens for displaying textual, video and audio ads besides schedules.

Figure 32:
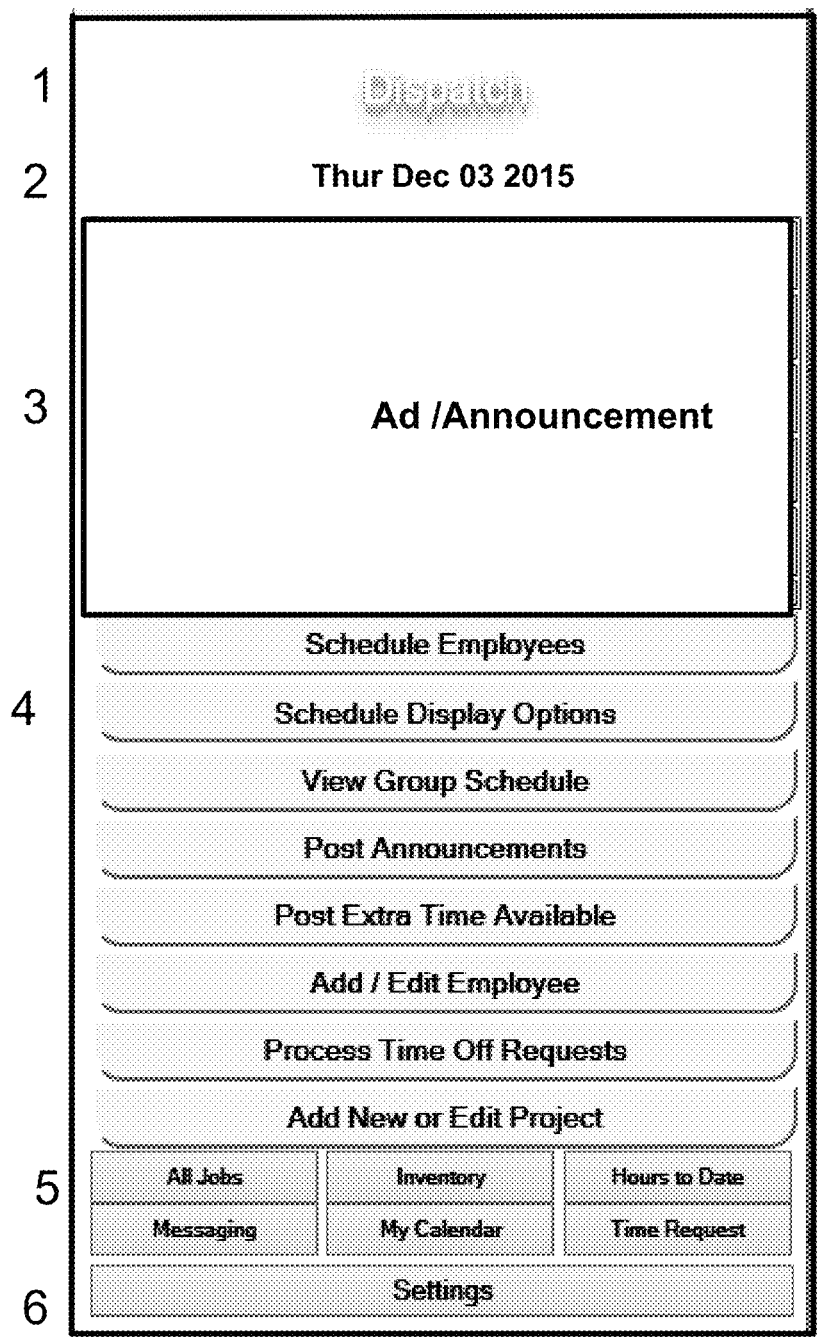

FIG. 32 displays a mobile app that is customizable. The scheduler is utilized for all jobs including medical staff, moving companies and restaurants. It displays the type of industry or department on top 1, current date 2 and a screen for showing ads 3. It further comprise of button links utilized for scheduling workers and accomplishing other tasks as listed on the interface 4. The mobile app provides a button link for processing inventory in that industry, another for checking hours to date, messaging, calendar for tracking activities and time off request button 5 which is utilized to process time off requests on a supervisor's model. The settings button link edits the options.

All software programs can only run when installed on hardware devices including servers which distribute data to individual devices. FIG. 33 is a universal system board that covers computers, televisions and mobile phones. It is included in this application to show how the instructions transmitted by algorithms to the processor via user interfaces interact with database schemas in memory 319. On a mobile phone or computer device, a user submits commands through an icon or button to launch an application that displays a graphical user interface from which the user executes additional commands FIG. 1-14. The Input Output (I/O) ports 509 on FIG. 33 are connected to the keyboard, mouse and display of the user device. The I/O receives user instructions and submits them to the central processing unit (CPU) or processor 322 via the I/O Controller 314 and Memory Controller 321. The processor invokes the algorithms in the particular program or application. Some of the algorithms executes from the user device while others executes from servers. The algorithms results into displaying of more user interfaces, data collection and submission to the server. The processors on the servers also work with the algorithms to process the data and save it in database schemas which are stored in server memory 319. Similarly, data is retrieved from database schemas on servers, processed and displayed to the user mobile phone or computer accordingly.

What is claimed:

1. A method of providing modules to build and complete functionality of mobile phone apps for business applications and provide a system for electronic short term job processing comprising:
- launching an app on a mobile phone or a computer and executing a first algorithm that controls an initial user interface, creates a user account and controls authentication;
- displaying a user interface with at least four tabs comprising a login tab for providing login fields, an about tab for providing information about a company, a contact tab for contacting the company and a FAQ tab for connecting to a server and displaying frequently asked questions,
  - wherein the login tab, when opened, displays an interface with a create account button for creating an account for new users, a text field for entering a user email or a phone number for logging in, a second text field for entering a password, a link for resetting the password, a checkbox for keeping a first algorithm user logged in after authentication, a login button that submits the user email or the phone number, and the password to authenticate the first algorithm user,
  - displaying a second user interface with text fields and a submit button for the first algorithm user to enter a name, an email and a phone number to create the account;
- the second user interface further providing a user category selection for selecting a type of user, wherein the type of user is selected from a group comprising a job seeker user type for creating a short term worker or job seeker account and an employer user type for creating an employer account, wherein a selection of the employer user type creates a company profile; and wherein a selection of the job seeker user type creates a personal profile from which a job seeker uploads job seeker data comprising identification and work authorization documents, a job history, skills required for jobs, documents, tax information, payment info, and chooses desired jobs, and provides references,
  - wherein selecting the submit button causes instructions to be submitted to a processor to save the job seeker data uploaded through the personal profile to a database in a memory of the server;
- executing a second algorithm for:
  - displaying menus that identify users by user type to display a user menu interface when account setup requirements are complete; and
  - providing menus utilized by various types of clients including employers, workers or job seekers, sales agents, staff and admin, wherein the clients are identified by a client type and are presented with a particular menu that corresponds to a particular type of client logging in; and
- executing a third algorithm that displays short term jobs, authenticates a third algorithm user and reads a plurality of system settings default values to determine if criteria for a job selection are met, wherein the criteria include the third algorithm user being within a prescribed distance to job worksites by reading a starting point which is either a current location or a home address determined using positioning coordinates obtained from at least three ground stations or from a service station and utilizing the current location or the home address and each of a plurality of worksite addresses to obtain a distance to each of a plurality of posted job worksite addresses in the database wherein a distance within a selected default radius triggers the second algorithm that displays short term jobs to check if the third algorithm authenticated user has skills required for each job and the job is added to a runtime entity or a data structure by looping through the database until all jobs within the selected default radius, are read into the data structure; and
- passing the data structure to a front end different from where data is formatted;
- and displaying a listing of short term jobs on a mobile phone or a computer showing a job Id, a title, a description, a location city, a pay rate, an estimated number of hours, a date and a time;
- having a sales agent provide a sales identity to authenticate the sales agent and directing the sales agent with to a sales menu interface, wherein the second algorithm that identifies users by the user type provides the sales menu interface utilized by sales agents to facilitate functions of the sales agent including: viewing client companies, viewing a personal sales commission, changing payment methods to include one of direct deposit, pre-paid cards, electronic check or location pickup, changing payment notification, updating tax deduction information and changing personal info, wherein the third algorithm utilizes a plurality of interfaces with submit buttons that transmit data to the server; and workers that work for companies signed up by sales agents, are tied to the sales agents and the companies utilizing a user id and a company code to determine sales compensation for the sales agents;
- executing a fourth algorithm that rates workers to rate short term workers, wherein said fourth algorithm authenticates a fourth algorithm user and displays a graphical user interface (GUI) for rating and valuating short term workers by selecting a worker or a group of workers that worked on a project associated with the fourth algorithm authenticated user, and displays a picture of the worker and a name button link;
- hitting the picture or the name button link to display the GUI for rating the worker;
- hitting a choice on the GUI to give a rating corresponding to the choice, wherein the rating adds a positive number between 1 and 5 or subtracts a number value corresponding to a negative number selected by the fourth algorithm authenticated user to reduce a numerical running total value of the worker in the database on the server and linking the project to a rating of the worker for statistical analysis; and
- having a fifth algorithm display ratings and reviews of short term workers, authenticate an employer; and when the employer is authenticated, the fifth algorithm displays an employer main menu interface; and
- having a submit invoice adjustment button link on the employer main menu interface display an interface for submitting invoice adjustments, wherein the interface for submitting invoice adjustments interacts with a sixth algorithm that processes invoices, invoice adjustments, financial reports and tax documents, and submits instructions to a user's mobile phone processor or computer's processor and, invokes the sixth algorithm to read, process and save data to the database in the memory of the server.

2. The method of claim 1, further comprising:
a seventh algorithm adjusting time entries and processing discount coupons, providing for editing of a short term worker start time entry and a short term worker end time entry into a timesheet;

wherein the first algorithm that controls the initial user interface, creates a user account and controls authentication, invokes a user interface that provides a text field for a user name in form of an email or a phone number, another text field for a password and a submit button for a user to login wherein the submit button causes instructions to be transmitted to a processor to authenticate the user from the database on the server; the first algorithm checking to see if a user login was saved either locally on a user device or on the server, and authenticating the user to the user menu interface displayed basing on a user type after testing for completion of the account setup requirements;

wherein the user menu interface displays on a mobile device or a computer in a tabular format with button links for opening new interfaces that accomplish user menu interface tasks as showed on the button links;

wherein the user menu interfaces includes a worker menu interface, the employer main menu interface, the sales menu interface, and a staff menu interface;

displaying the user menu interfaces, involves a user of type short term worker and a user of type employer creating an account and specifying the user category or the user type during account creation, and providing a name, an email, a phone number and a password, and saving the account to the database or a file in the server memory;

the user of type sales agent, and the user of type staff requesting for accounts; and accounts getting created for the users; and a user logging onto a mobile phone app or a website on a computer utilizing the email or the phone number and a password, and the system reading the user category or the user type from the database wherein the user is identified by the user category or the user type to authenticate to the user menu interface that corresponds to the user category or user type, displaying the user menu interface on a mobile device or a computer, and showing the user menu interface tasks the authenticated user type can perform.

3. The method of claim 2, further comprising:

the second algorithm that identifies users by user type to display the user menu interface when account setup requirements are complete providing the worker menu interface utilized by users of type short term workers or job seekers;

the second algorithm testing for a user type and account setup completion each time a user logs onto the system;

the user receiving a message when a user is not authenticated relating to the reason for not authenticating;

the algorithm testing to see if the user has a profile created when the user is authenticated, and if no profile is detected, the user is provided with an interface for creating a profile, and when a profile is created, the user is tested for a user type prior to displaying the worker menu interface;

if the user is of the type worker, the user is tested for account setup completion which includes completion of a job history section;

directing the user to a menu that displays a button link for completing the job history, and button links for completing anything incomplete in the job history section;

directing the user to a menu that provides a button link for filling out a skills section if the skill section is not completed;

directing the user to a menu where the user can upload the required work related documents if required work related documents, pay stubs, resumes, and a copy of an identification license are not uploaded;

directing the user to a menu that displays all jobs in the system for the user to select desired jobs if desired jobs are not selected;

referring the user to a page from where to fill out work authorization data and provide work authorization documents if work authorization is not provided;

if tax paperwork is not filled, the user is directed to a page from where to fill tax paperwork;

displaying, when account setup requirements are completed, the worker menu interface for the worker also known as a short term worker or a job seeker;

wherein the worker menu interface provides button links for tasks performed by a user granted worker privileges when registering in the system a first time;

wherein the button links on the worker menu interface includes: a button link for viewing available jobs, a button link for uploading new photos, a button link for changing a payment method, a button link for updating tax deduction info, a button link for uploading documents including a driver's license copy, a button link for changing a personal info which includes an address, an email and a phone number, a button link for facilitating shared rides, a button link for viewing hours worked at any given time, and a settings button link for setting and configuring the mobile phone app; and wherein opening the button links on the worker menu interface further displays a plurality of interfaces with tabs, radio buttons, text fields, dropdowns and submit buttons that facilitates changes and updates.

4. The method of claim 3, wherein the worker menu interface provides button links to facilitate shared rides with ride provider companies by electronically linking to a ride provider's software utilizing button links, a user id and a job id and linking to an account of a worker that provides ride services to a jobsite a ride seeker is going; and wherein the button links to facilitate shared rides include a first button link for initiating a ride and second button link that facilitates a process of joining a ride share already initiated in the mobile phone app; and wherein the ride seeker requests for a ride utilizing at least one button link on the mobile phone app interface which submits instructions to the processor and causes the processor to retrieve ride information by providing the user id and a related job id as variables to a database query in the server memory and save ride request instructions to the database.

5. The method of claim 3 wherein the worker menu interface, displayed in a tabular format, provides button links for updating information in the database or files wherein the button link for setting or changing a payment method or information by which the worker is paid, which payment method includes: direct deposit, prepaid cards, electronic check and location pickup, changes payment information for a plurality of workers;

wherein the button link for updating tax info, updates tax deduction information for the plurality of workers and the button link for changing the personal info changes the address, the email, the phone number, and the skills and the jobs desired of the user;

wherein the worker menu interface displays on a mobile phone or computer at logon, showing the button links;

wherein the button links on the worker menu interface further displays interfaces with tabs, radio buttons, text fields, dropdowns and submit buttons that are utilized to make changes to an authenticated worker's data; and a submit button on each of the displayed interfaces transmits instructions to the processor to save the changes to the database in the server memory.

6. The method of claim 2, wherein the second algorithm that identifies users by user type to display the user menu interface when account setup requirements are complete, provides the worker menu interface with the button link for viewing hours worked; wherein opening the button link for viewing hours worked displays an interface utilized by workers to record and edit timesheet hours on the mobile phone app;

wherein the seventh algorithm that adjusts time entries and processes discount coupons provides for editing of the short term worker start time, and end time entries into the timesheet; wherein the button link for viewing hours worked, transmits instructions to the processor to read timesheet data from the database or files on the server and displays the timesheet data in a column besides edit buttons on a time fix interface;

wherein the seventh algorithm that adjusts time entries and process discount coupons, reads and validates user input, and places a job number or an invoice number entered into a data structure such as an array or variables, and submits the entry along with a session user id to the server, and assigns data to variables which are utilized to extract previously recorded time entries;

wherein the previously recorded time entries are placed into a data structure and returned to the user device front end to display on the time fix interface for editing, wherein the time fix interface displayed on the mobile device or computer, provides or shows time tracking including: a Clock In Time with a button for editing the clock in time, a First Break Out, a First Break In, a Lunch Break Clock Out, a Lunch Clock In, a Second Break Out, a Second Break In, a Travel Time, and a Final Clock Out Time with respective buttons for editing the time; and wherein the edit buttons opens new interfaces from which to edit time data and submit buttons on the interfaces, transmit instructions to the processor to save the time data for short time workers to the database in server memory, and a supervisor or manager approves.

7. The method of claim 1 further comprising;

an eighth algorithm displaying the employer main menu interface and adding backup employers to an employer billing account, testing an authenticated employer for creation of a personal profile, creation of a company profile and creation of, or association with, a billing or a company account;

displaying the employer main menu interface for the authenticated employer, on a mobile device or computer;

wherein the employer main menu interface has a button link for facilitating posting of short term jobs, a button link for accepting of job applicants, a button link for rating workers and writing reviews on the workers, a button link for viewing and paying invoices, a button link for submitting an invoice adjustment, a button link for adding a backup employer account, a button link for changing a company profile, and a button link for recording time or managing hours worked, opens a plurality of graphical user interfaces (GUI) to execute commands corresponding to the button links of the employer main menu interface;

adding a backup employer utilizing a GUI from a mobile phone app or a website;

wherein the backup employer requests for an account by providing a name, an email, a phone number and a message, and saves the request to the database on the server; and the authenticated employer user possessing or having administrative rights to add backup employer users to the company account for the backup employers to process hiring and payment of short term workers, utilizes the button link for adding a backup employer account on the employer main menu interface, and displaying a user interface that adds backup employers by listing name, email and phone number attributes of the users that request to be added to the company billing account as backup employer users;

submitting to the server for verification along with the admin employer's user id and wherein the eighth algorithm reads the admin employer's billing account and tests the attributes submitted to see if the attributes match the profile on the server and the admin employer's billing account and user id, and inserts a record into a profile entity and notifies the backup employer and the admin employer.

8. The method of claim 7, wherein the button link for facilitating posting of short term jobs on the employer main menu displays a new interface utilized by employers to enter job details for resume based jobs, and another interface for non-resume jobs, specifying a job title, a job description, a pay rate, a number of hours, and a job site address;

wherein the job details entered by an authenticated employer are submitted to save to the database on the server as short term jobs data; and wherein the short term jobs data is retrieved from the server, formatted and displayed as a listing of short term jobs to authenticated users in a tabular format, on mobile devices or computers showing the job id, the job title, the job description, the jobsite address or location, the pay rate, the estimated number of hours, and the date and time a worker is needed at the jobsite address.

9. The method of claim 7, wherein the button link for rating workers and writing reviews on workers executes a command that displays a graphical user interface (GUI) from which to rate and evaluate the short term workers on a mobile device or computer wherein the GUI having button links;

wherein a drop down menu from which to select an item or a job worked on by the short term workers and a search field in which a rater types a job number as an alternative to the dropdown menu displays a job number, a job date, a job time and numerical numbers ranging from zero to five to choose from while rating the short term workers, and displays at least one graphical star; and the rater choosing one of the numerical numbers zero to five, each representing a graphical rating;

wherein the item or job selected from the dropdown menu, obtained through the search field or displayed by default as a single item, displays related details on a screen for the rater to ensure a right choice to rate, and the short term workers are evaluated utilizing a numerical method that assigns a percentage number value to an input graphical rating and stores the assigned percentage number value numerically, accumulating a numerical total as points in the database, in the server memory along with comments or reviews.

10. The method of claim 9, wherein the graphical user interface (GUI) from which to rate and evaluate the short term workers on a mobile device or a computer provides a submit button that causes instructions to be transmitted to the processor and display a new graphical user interface (GUI) with a special button link that gives a negative rating to subtract points from the points in the database in the server memory;
wherein the special button link, when selected, gives a negative rating utilized to deduct points from the numerical total a worker has accumulated in the database; and
wherein grayed out graphics on the new GUI are displayed to show the rater how many points the rater has deducted from the numerical total.

11. The method of claim 9, further comprising: the graphical user interface from which to rate and evaluate the short term workers displaying a text area for entering reviews or comments;
the rater giving a review in the text area and submitting the review to be saved to the database in the server memory from where reviews are extracted into a data structure and passed to a front end of a user device when displaying available workers and ratings to other users; and
a user opening a link to view the submitted review.

12. The method of claim 9, further comprising: a rater executing a command to display the graphical user interface (GUI) from which to rate and evaluate the short term workers on a mobile device or a computer;
the rater choosing a button link with a numerical number of five as a rating to a short term worker;
the button link transmitting instructions to the processor to save the rating of five to the database on the server;
the short term worker logging onto the system and getting authenticated;
providing a button link to the short term worker showing a rating of five stars given by the rater also known as a supervisor;
the authenticated worker hitting the button link with a five star rating to request the employer that gave the rating to be added to a group of possible references seen by future employers for referral contact;
wherein the references are stored as links to the corresponding supervisors that accepts to be contacted in the system; and
the future employers opening the links to view and contact the references.

13. The method of claim 7, further comprising
the button link for accepting of job applicants executing a command that displays a graphical user interface (GUI) for listing job applicants that have applied for a job and waiting to be accepted by an employer;
the GUI for listing job applicants showing a skills button link, ratings, and reviews;
wherein the ninth algorithm that displays job applicants and logged in workers that are available to an authenticated employer iterates through the database on the server, places records into a data structure, and passes the data structure to the front end for display;
wherein the fifth algorithm that displays ratings and reviews extracts numerical values of ratings from the database and passes the numerical values of the ratings to a module that converts said numerical values to dynamically generated graphics equivalent to the assigned percentage number values and displays on the GUI for listing job applicants;
the module converting a percentage of 20 out of 100 to one graphical star when displaying and
wherein the reviews are displayed as links that are further opened to read details.

14. The method of claim 1, further comprising;
a ninth algorithm displaying job applicants and logged in workers that are available to an authenticated employer for hiring;
displaying an interface showing the job applicants as a listing of workers that applied for a posted short term job in a tabular format, showing for each job applicant, a worker picture, a name button, ratings, reviews as links, a skills button link and a previous work status in relation to the authenticated employer;
an available workers button link on the interface displaying available workers logged onto the system, wherein the employer submits commands through an icon or button to launch an application;
the application displaying a graphical user interface on a mobile phone or a computer device for logging in;
the application authenticating the employer displaying the employer main menu interface with button links, including the button link for accepting job applicants;
the employer opening the button link for accepting the job applicants to check for short term workers that applied for a job, wherein the button link for accepting job applicants causes the ninth algorithm that displays job applicants to read an entity containing available workers or job applicants in the database and iterates through all workers that qualify while checking whether a worker has ever worked for the authenticated employer;
filtering by comparing the worker id to the client or employer id and other qualifiers including ratings and reviews;
assigning a worker that has ever worked for the authenticated employer a previous worker status;
the ninth algorithm further checking if the worker has the skills required for the posted job prior to adding the worker to a view or runtime entity of available workers; and
the ninth algorithm comparing the worker's distance to the worksite and adding the worker to the view or data structure for the particular job if located within a set distance;
wherein the job applicants in the system are extracted from the database or file on the server into a data structure and the data structure is passed to a client side and displayed as a listing of available workers that the employer hires; and
reading the skills and reviews from the database into a data structure then, from the data structure, onto a display of a mobile device or a browser screen from where the employer opens the reviews or skills displayed as buttons or anchor links.

15. The method of claim 1 further comprising;
a tenth algorithm accepting workers at a job site and tracking hours and payments, authenticating an employer on a mobile device or computer and displaying the employer main menu interface
wherein the employer main menu interface has button links, including a button link for starting a clock and a button link for ending a clock for a day or a week of work, generates data driven button links that are utilized in computing hours worked to facilitate time tracking;

opening the button link for starting a clock on the employer main menu opens a start clock menu interface displaying worker information generated based on records in the database or file system;

wherein the start clock menu interface displays a list of accepted workers scheduled to work on an authenticated employer's job;

wherein each worker's record has a corresponding name detail with a worker picture, time the worker is scheduled to start working, a start clock button link that registers the particular worker's start time, and an edit start time button link for editing and registering the start time for the worker listed in a row where the button link is located;

the start clock menu interface further displaying a start clock for all button link for starting time for all workers at the same time and a edit clock for all button link for editing time for all workers to start at the same time;

wherein each button link on the start clock menu interface is data driven and connected to a record of a single worker;

wherein the start time or time at which a job starts is started individually for each worker's name using a corresponding dynamic button link that starts the clock for each worker or person;

wherein the data driven button links are dynamically generated, and displayed along other textual records at runtime;

opening the button link for ending a clock on the employer main menu interface opens an end clock menu interface with worker information dynamically generated based on records in the database or file system, displaying workers on a job whose clock or time was started by the start clock button link;

wherein the workers' names are each displayed along with a button link for recording the end time for each worker individually and another button link for editing the end time for each worker individually;

the end clock menu interface further providing a stop clock button link for stopping time for all workers at the same time and an edit stop clock button link for editing the end time for an entire group when the stop or the end time is the same for all the workers;

wherein the employer utilizes the start clock button link for each worker, the start clock for all button link for all workers on a job, the edit clock button for each worker and the edit clock for all button link to edit stop clock for an entire group of workers;

the employer further utilizing the button link for recording the end time for each worker individually, the button link for editing the end time for each worker individually, and the stop clock button link for stopping time for all workers at the same time to record the end time; and wherein the hours worked are calculated from the end time and the start time to determine wages.

16. The method of claim 15, wherein the hours worked are saved to the database in server memory utilizing an employer mobile phone app time tracking module, a punch card, a computer or a worker mobile phone app;

wherein a field named maximum hours and a field named minimum hours are set in the system such that when a worker records hours worked or edits the hours worked beyond the maximum allowed hours per day or per week, the system triggers an alert to management to check out the worker's data entry for errors prior to processing a check;

wherein the field named maximum hours is established in the database and assigned a numerical value beyond which no hours can be worked in a day or a week, and the field named minimum hours is established in the database and assigned a numerical value of zero;

wherein the tenth algorithm that accepts workers at a job site and tracks hours and payments converts the input start time and the end time data to a 24 hour clock, converts hours to minutes, and subtracts the start time minutes from the end time minutes to get minutes worked; and wherein the tenth algorithm compares the minutes worked to the maximum hours worked in minutes, to ensure minutes worked do not exceed the maximum hours worked in minutes as set in the system, to prevent overpayment of workers.

17. The method of claim 1, wherein the first algorithm that controls the initial user interface, creates a user account and controls authentication, displays a user interface with a create account button link for creating an account;

wherein the create account button link displays a second interface which provides an option to choose between an employer account and a worker account;

wherein the employer account creates a personal profile and a company profile, and a worker account creates a personal profile;

the first algorithm authenticating a user onto the user menu interface which displays on a mobile device or a computer based on user type;

the employer account posting ads that are saved to the database on the server;

the ads being read from the database into data structures or variables and the data structures, when a user launches the mobile phone app on a mobile device, are passed to the front end of the mobile device; and displaying the ads for the user as text, audio and video on the mobile device.

18. The method of claim 1, further comprising: the first algorithm controlling the initial user interface, creating a user account and controlling authentication displays the user menu interface with a contact tab that, when opened, also displays an interface where users enter a name, an email, a phone number and a message;

a sales agent utilizing a partial registration process to create an account by submitting a user account request, and entering a name, an email and a phone number into an interface to create the account in the database on the server;

an application administrator logging onto the system;

the application administrator being authenticated onto an admin menu;

the application administrator confirming the sales agent's account and saving the account request to the database on the server;

the sales agent logging onto the system and being authenticated to the sales menu interface;

the sales menu interface providing button links to facilitate functions of the sales agent including: viewing of client companies, viewing a personal sales commission, changing methods by which the sales agent is paid, editing a payment notification, updating taxation documents and updating a personal profile which includes an email, a phone number and an address; and wherein the sales agent is compensated with a predetermined percentage commission viewable by authentication and electronically payable.

\* \* \* \* \*